(12) United States Patent
Hendry et al.

(10) Patent No.: US 12,250,412 B2
(45) Date of Patent: *Mar. 11, 2025

(54) METHOD AND APPARATUS FOR PROCESSING HIGH LEVEL SYNTAX IN IMAGE/VIDEO CODING SYSTEM

(71) Applicant: LG Electronics Inc., Seoul (KR)

(72) Inventors: Hendry Hendry, Seoul (KR); Junghak Nam, Seoul (KR); Seunghwan Kim, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/509,983

(22) Filed: Nov. 15, 2023

(65) Prior Publication Data

US 2024/0089506 A1 Mar. 14, 2024

Related U.S. Application Data

(63) Continuation of application No. 18/073,903, filed on Dec. 2, 2022, now Pat. No. 11,936,914, which is a continuation of application No. PCT/KR2021/006904, filed on Jun. 3, 2021.

(60) Provisional application No. 63/034,946, filed on Jun. 4, 2020, provisional application No. 63/033,853, filed on Jun. 3, 2020.

(51) Int. Cl.
*H04N 19/172* (2014.01)
*H04N 19/176* (2014.01)
*H04N 19/503* (2014.01)
*H04N 19/593* (2014.01)
*H04N 19/70* (2014.01)

(52) U.S. Cl.
CPC ........... *H04N 19/70* (2014.11); *H04N 19/172* (2014.11); *H04N 19/176* (2014.11); *H04N 19/503* (2014.11); *H04N 19/593* (2014.11)

(58) Field of Classification Search
CPC .... H04N 19/44; H04N 19/503; H04N 19/172; H04N 19/513; H04N 19/184; H04N 19/423; H04N 19/70; H04N 19/593; H04N 19/176
See application file for complete search history.

(56) References Cited

U.S. PATENT DOCUMENTS

| | | | |
|---|---|---|---|
| 10,148,969 B2 * | 12/2018 | Hendry | H04N 21/23439 |
| 2019/0320196 A1 * | 10/2019 | Yu | H04N 19/52 |
| 2021/0235124 A1 * | 7/2021 | Seregin | H04N 19/44 |
| 2021/0274192 A1 * | 9/2021 | Panusopone | H04N 19/53 |

(Continued)

*Primary Examiner* — Tsion B Owens
(74) *Attorney, Agent, or Firm* — Fish & Richardson P.C.

(57) ABSTRACT

A video decoding method performed by a video decoding apparatus, according to the present document, comprises the steps of: acquiring general constraint information from a bitstream; parsing, from the bitstream, a flag indicating whether or not the general constraint information includes information about constraints to which output layer sets conform; parsing the information about the constraints in the general constraint information on the basis of the flag; and decoding a current picture on the basis of the information about the constraints, wherein the general constraint information includes number information and alignment information about the constraints, and, within the general constraint information, the alignment information may be present after the number information.

13 Claims, 11 Drawing Sheets

(56) References Cited

U.S. PATENT DOCUMENTS

| | | | | |
|---|---|---|---|---|
| 2021/0368209 A1* | 11/2021 | Coban | ............... | H04N 19/1883 |
| 2023/0032818 A1* | 2/2023 | Choi | ...................... | H04N 19/46 |
| 2023/0188744 A1* | 6/2023 | Yu | ......................... | H04N 19/96 |
| | | | | 375/240.16 |
| 2024/0089506 A1* | 3/2024 | Hendry | ................. | H04N 19/30 |

* cited by examiner

METHOD AND APPARATUS FOR PROCESSING HIGH LEVEL SYNTAX IN IMAGE/VIDEO CODING SYSTEM

CROSS-REFERENCE TO RELATED APPLICATIONS

This application is a continuation of U.S. application Ser. No. 18/073,903, filed on Dec. 2, 2022, which is a continuation of International Application No. PCT/KR2021/006904, filed on Jun. 3, 2021, which claims the benefit of U.S. Provisional Application Nos. 63/034,946, filed on Jun. 4, 2020, and 63/033,853, filed on Jun. 3, 2020. The disclosures of the prior applications are incorporated by reference in their entirety.

TECHNICAL FIELD

The present technology relates to a method and an apparatus for processing high level syntax in case of encoding/decoding image/video information in an image/video coding system.

BACKGROUND

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

A technical subject of the present document is to provide a method and an apparatus for enhancing image/video coding efficiency.

Another technical subject of the present document is to provide a method and an apparatus for efficiently processing high level syntax in case of coding image/video.

Still another technical subject of the present document is to provide a method and an apparatus for skipping parsing of general constraint information in processing high level syntax.

Yet still another technical subject of the present document is to provide a method and an apparatus for processing profile, tier, and level information separately from general constraint information in processing high level syntax.

According to an embodiment of the present document, a video decoding method performed by a video decoding apparatus may include: obtaining general constraint information from a bitstream; parsing, from the bitstream, a flag representing whether information on constraints to which output layer sets conform is present in the general constraint information; parsing the information on the constraints from the general constraint information based on the flag; and decoding a current picture based on the information on the constraints, wherein the general constraint information includes number information on the constraints and alignment information, and wherein the alignment information is present next to the number information in the general constraint information.

According to another embodiment of the present document, a video encoding method performed by a video encoding apparatus may include: performing inter prediction or intra prediction for a current block in a current picture; generating prediction information for the current block based on the inter prediction or the intra prediction; and encoding image information including the prediction information, wherein the image information includes a flag representing whether information on constraints to which output layer sets conform is present in general constraint information of the image information, wherein the general constraint information includes number information on the constraints and alignment information, and wherein the alignment information is present next to the number information in the general constraint information.

According to still another embodiment of the present document, a computer-readable digital storage medium including information causing a video decoding apparatus to perform a video decoding method, wherein the video decoding method may include: obtaining general constraint information from image information; parsing, from the image information, a flag representing whether information on constraints to which output layer sets conform is present in the general constraint information; parsing the information on the constraints from the general constraint information based on the flag; and decoding a current picture based on the information on the constraints, wherein the general constraint information includes number information on the constraints and alignment information, and wherein the alignment information is present next to the number information in the general constraint information.

According to an embodiment of the present document, the overall image/video compression efficiency can be enhanced.

According to an embodiment of the present document, the general constraint information can be efficiently signaled in signaling the image/video information.

According to an embodiment of the present document, the parsing of the general constraint information can be skipped in processing the high level syntax.

According to an embodiment of the present document, the profile, tier, and level information can be processed separately from the general constraint information in processing the high level syntax.

DETAILED DESCRIPTION

Figure 1:
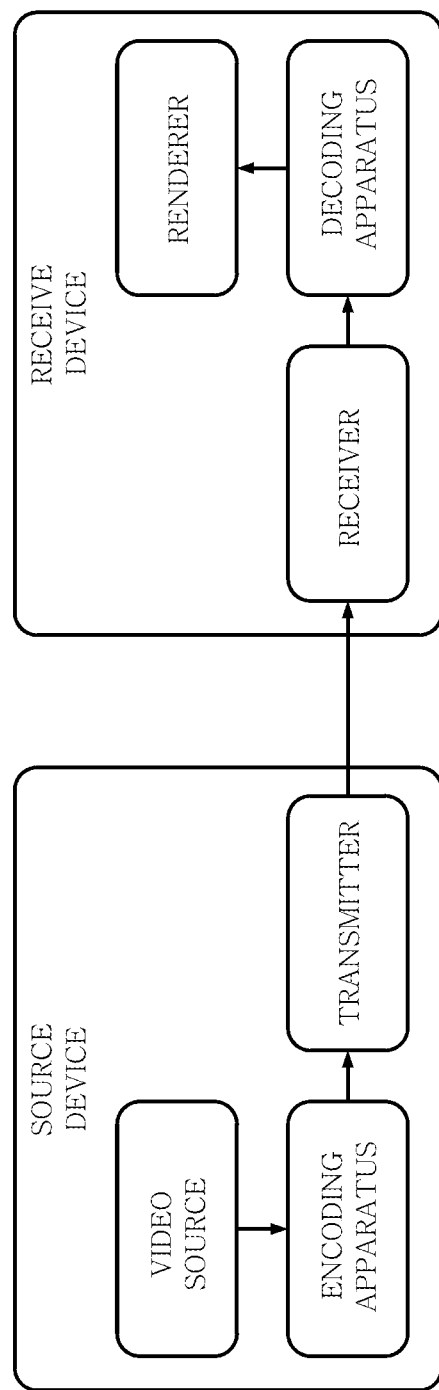
FIG. 1 schematically illustrates an example of a video/image coding system to which embodiments of the present document are applicable.

The disclosure of the present document may be modified in various forms, and specific embodiments thereof will be described and illustrated in the drawings. The terms used in the present document are used to merely describe specific embodiments, but are not intended to limit the disclosed method in the present document. An expression of a singular number includes an expression of 'at least one', so long as it is clearly read differently. The terms such as "include" and "have" are intended to indicate that features, numbers, steps, operations, elements, components, or combinations thereof used in the document exist and it should be thus understood that the possibility of existence or addition of one or more different features, numbers, steps, operations, elements, components, or combinations thereof is not excluded.

In addition, each configuration of the drawings described in the present document is an independent illustration for explaining functions as features that are different from each other, and does not mean that each configuration is implemented by mutually different hardware or different software. For example, two or more of the configurations may be combined to form one configuration, and one configuration may also be divided into multiple configurations. Without departing from the gist of the disclosed method of the present document, embodiments in which configurations are combined and/or separated are included in the scope of the disclosure of the present document.

In the present document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in the present document should be interpreted to indicate "additionally or alternatively."

Further, the parentheses used in the present document may mean "for example". Specifically, in case that "prediction (intra prediction)" is expressed, it may be indicated that "intra prediction" is proposed as an example of "prediction". In other words, the term "prediction" in the present document is not limited to "intra prediction", and "intra prediction" is proposed as an example of "prediction". Further, even in case that "prediction (i.e., intra prediction)" is expressed, it may be indicated that "intra prediction" is proposed as an example of "prediction".

In the present document, technical features individually explained in one drawing may be individually implemented or simultaneously implemented.

Hereinafter, embodiments of the present document will be described in detail with reference to the accompanying drawings. In addition, like reference numerals are used to indicate like elements throughout the drawings, and the same descriptions on the like elements may be omitted.

The present document relates to video/image coding. For example, a method/embodiment disclosed in the present document may be applied to a method disclosed in a versatile video coding (VVC) standard. In addition, the method/embodiment disclosed in the present document may be applied to a method disclosed in an essential video coding (EVC) standard, AOMedia Video 1 (AV1) standard, 2nd generation of audio video coding standard (AVS2), or a next-generation video/image coding standard (e.g., H.267, H.268, etc.).

Various embodiments related to video/image coding are presented in the present document, and the embodiments may be combined with each other unless otherwise stated.

FIG. 1 illustrates an example of a video/image coding system to which the embodiments of the present document may be applied.

Referring to FIG. 1, a video/image coding system may include a first device (a source device) and a second device (a reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture). A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture). A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. In the present document, tile group and slice may be used interchangeably. For example, in the present document, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. Cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

Figure 2:
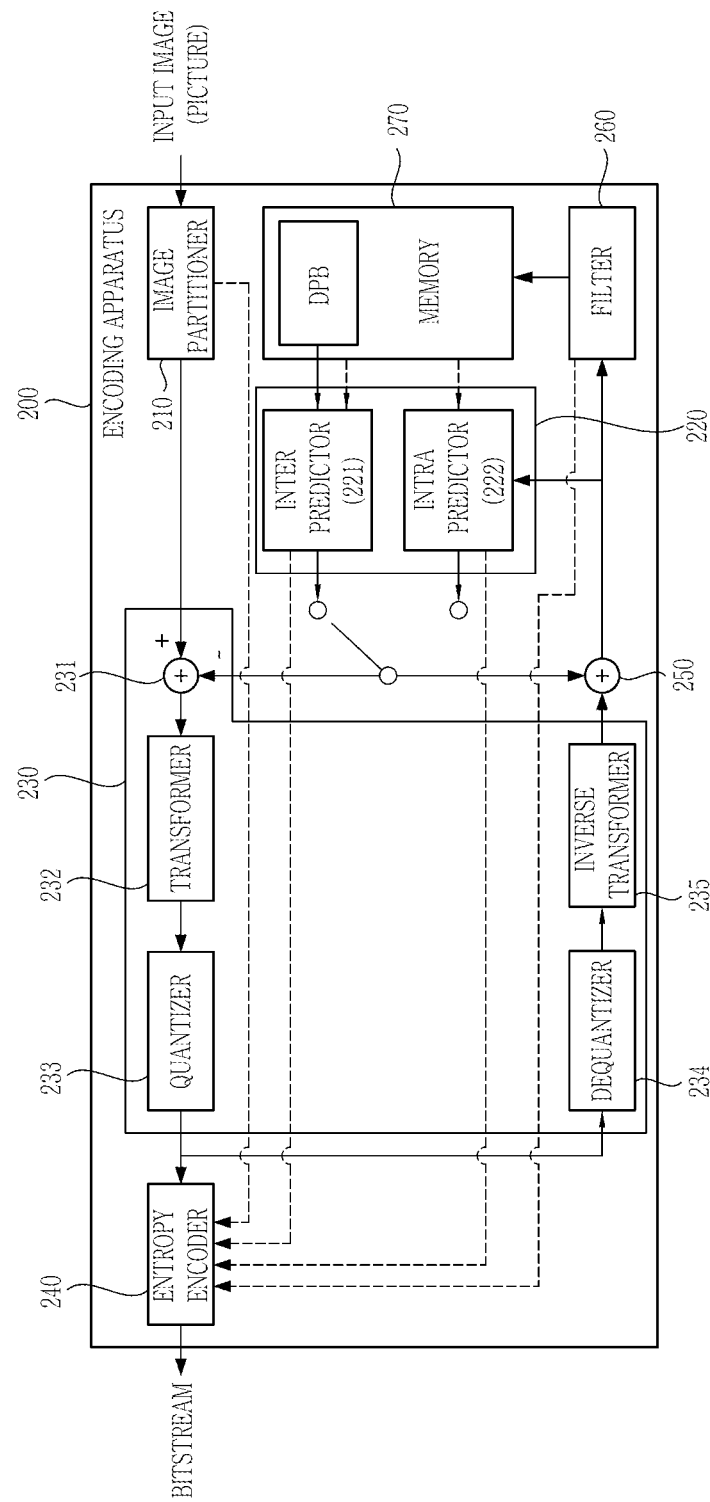
FIG. 2 is a diagram schematically illustrating a configuration of a video/image encoding apparatus to which the embodiments of the present document are applicable.

FIG. 2 is a diagram schematically illustrating the configuration of a video/image encoding apparatus to which the embodiments of the present document may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present document may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The encoding apparatus 200 may subtract the prediction signal (predicted block, prediction sample array) output from the inter predictor 221 or the intra predictor 222 from the input image signal (original block, original sample array) to generate a residual signal (residual block, residual sample array), and the generated residual signal is transmitted to the transformer 232. In this case, as illustrated, a unit for subtracting the prediction signal (prediction block, prediction sample array) from an input image signal (original block, original sample array) in the encoder 200 may be referred to as a subtractor 231. The predictor 220 may perform prediction on a processing target block (hereinafter, referred to as a current block) and generate a predicted block including prediction samples for the current block. The predictor 220 may determine whether intra prediction or inter prediction is applied in units of a current block or CU. The predictor 220 may generate various kinds of information on prediction, such as prediction mode information, and transmit the generated information to the entropy encoder 240, as is described below in the description of each prediction mode. The information on prediction may be encoded by the entropy encoder 240 and output in the form of a bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 220 may generate a prediction signal based on various prediction methods to be described below. For example, the predictor 220 may apply intra prediction or inter prediction for prediction of one block and may simultaneously apply intra prediction and inter prediction. This may be called combined inter and intra prediction (CIIP). In addition, the predictor may be based on an intra block copy (IBC) prediction mode or based on a palette mode for prediction of a block. The IBC prediction mode or the palette mode may be used for image/video coding of content such as games, for example, screen content coding (SCC). IBC basically performs prediction within the current picture, but may be performed similarly to inter prediction in that a reference block is derived within the current picture. That is, IBC may use at least one of the inter prediction techniques described in the present document. The palette mode may be viewed as an example of intra coding or intra prediction. When the palette mode is applied, a sample value in the picture may be signaled based on information on the palette table and the palette index.

The prediction signal generated by the predictor (including the inter predictor 221 and/or the intra predictor 222) may be used to generate a reconstructed signal or may be used to generate a residual signal.

The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, GBT refers to transformation obtained from a graph when expressing relationship information between pixels in the graph. CNT refers to transformation obtained based on a prediction signal generated using all previously reconstructed pixels. Also, the transformation process may be applied to a block of pixels having the same size as a square or may be applied to a block of a variable size that is not a square.

The quantizer 233 quantizes the transform coefficients and transmits the same to the entropy encoder 240, and the entropy encoder 240 encodes the quantized signal (information on the quantized transform coefficients) and outputs the encoded signal as a bitstream. Information on the quantized transform coefficients may be referred to as residual information. The quantizer 233 may rearrange the quantized transform coefficients in the block form into a one-dimensional vector form based on a coefficient scan order and may generate information on the transform coefficients based on the quantized transform coefficients in the one-dimensional vector form.

The entropy encoder 240 may perform various encoding methods such as, for example, exponential Golomb, context-adaptive variable length coding (CAVLC), and context-adaptive binary arithmetic coding (CABAC). The entropy encoder 240 may encode information necessary for video/image reconstruction (e.g., values of syntax elements, etc.) other than the quantized transform coefficients together or separately. Encoded information (e.g., encoded video/image information) may be transmitted or stored in units of a network abstraction layer (NAL) unit in the form of a bitstream. The video/image information may further include information on various parameter sets, such as an adaptation parameter set (APS), a picture parameter set (PPS), a sequence parameter set (SPS), or a video parameter set (VPS). Also, the video/image information may further include general constraint information. In the present document, information and/or syntax elements transmitted/signaled from the encoding apparatus to the decoding apparatus may be included in video/image information. The video/image information may be encoded through the encoding procedure described above and included in the bitstream. The bitstream may be transmitted through a network or may be stored in a digital storage medium. Here, the network may include a broadcasting network and/or a communication network, and the digital storage medium may include various storage media such as USB, SD, CD, DVD, Blu-ray, HDD, and SSD. A transmitting unit (not shown) and/or a storing unit (not shown) for transmitting or storing a signal output from the entropy encoder 240 may be configured as internal/external elements of the encoding apparatus 200, or the transmitting unit may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transform unit 235. The adder 250 may add the reconstructed residual signal to the prediction signal output from the inter predictor 221 or the intra predictor 222 to generate a reconstructed signal (reconstructed picture, reconstructed block, reconstructed sample array). When there is no residual for the processing target block, such as when the skip mode is applied, the predicted block may be used as a reconstructed block. The adder 250 may be referred to as a restoration unit or a restoration block generator. The generated reconstructed signal may be used for intra prediction of a next processing target block in the current picture, or may be used for inter prediction of the next picture after being filtered as described below.

Meanwhile, luma mapping with chroma scaling (LMCS) may be applied during a picture encoding and/or reconstruction process.

The filter 260 may improve subjective/objective image quality by applying filtering to the reconstructed signal. For example, the filter 260 may generate a modified reconstructed picture by applying various filtering methods to the reconstructed picture, and store the modified reconstructed picture in the memory 270, specifically, in a DPB of the memory 270. The various filtering methods may include, for example, deblocking filtering, a sample adaptive offset, an adaptive loop filter, a bilateral filter, and the like. The filter 260 may generate various kinds of information related to the filtering, and transfer the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as a reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 may store the modified reconstructed picture for use as the reference picture in the inter predictor 221. The memory 270 may store motion information of a block from which the motion information in the current picture is derived (or encoded) and/or motion information of blocks in the picture, having already been reconstructed. The stored motion information may be transferred to the inter predictor 221 to be utilized as motion information of the spatial neighboring block or motion information of the temporal neighboring block. The memory 270 may store reconstructed samples of reconstructed blocks in the current picture, and may transfer the reconstructed samples to the intra predictor 222.

Meanwhile, image/video coding according to the present disclosure may include multilayer-based image/video coding. The multilayer-based image/video coding may include scalable coding. The multilayer-based coding or scalable coding may process input signals for each layer. Input signals (input image/picture) may differ in at least one of resolution, frame rate, bit-depth, color format, aspect ratio, and view depending on the layers. In this case, it is possible to reduce repeated transmission/processing of information and increase compression efficiency by performing prediction between layers using a difference between layers, namely, based on scalability.

Figure 3:
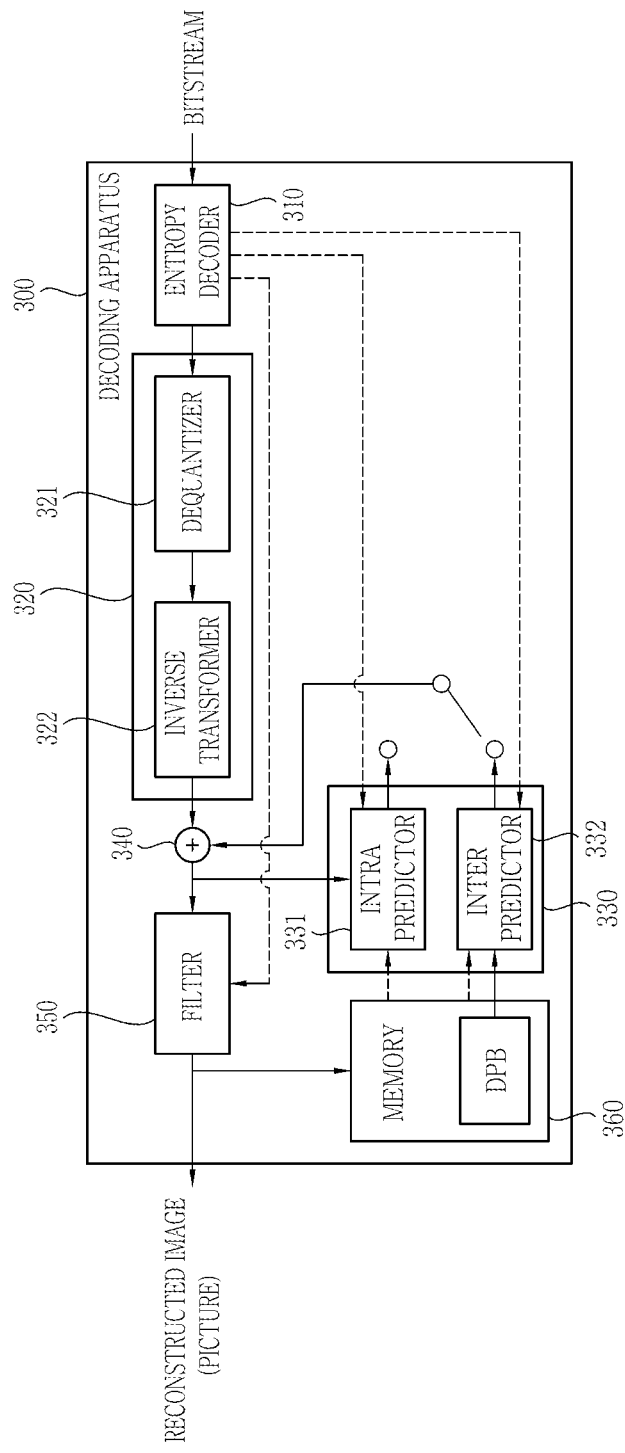
FIG. 3 is a diagram schematically illustrating a configuration of a video/image decoding apparatus to which the embodiments of the present document are applicable.

FIG. 3 is a diagram for schematically explaining the configuration of a video/image decoding apparatus to which the embodiments of the present document may be applied.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present document may be decoded may decode the decoding procedure and obtained from the bitstream. For example, the entropy decoder 310 decodes the information in the bitstream based on a coding method such as exponential Golomb coding, context-adaptive variable length coding (CAVLC), or context-adaptive arithmetic coding (CABAC), and output syntax elements required for image reconstruction and quantized values of transform coefficients for residual. More specifically, the CABAC entropy decoding method may receive a bin corresponding to each syntax element in the bitstream, determine a context model by using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (inter predictor 332 and intra predictor 331), and residual values on which the entropy decoding has been performed in the entropy decoder 310, that is, the quantized transform coefficients and related parameter information, may be input to the residual processor 320.

The residual processor 320 may derive a residual signal (residual block, residual samples, or residual sample array). Also, information on filtering among the information decoded by the entropy decoder 310 may be provided to the filter 350. Meanwhile, a receiving unit (not shown) for receiving a signal output from the encoding apparatus may be further configured as an internal/external element of the decoding apparatus 300, or the receiving unit may be a component of the entropy decoder 310. Meanwhile, the decoding apparatus according to the present document may be called a video/image/picture decoding apparatus, and the decoding apparatus may be divided into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, an inter predictor 332, and an intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

In the present document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficient may be called a coefficient or a residual coefficient or may still be called the transform coefficient for uniformity of expression.

In the present document, the quantized transform coefficient and the transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on inverse transform (transform) of the scaled transform coefficients. This may be applied/expressed in other parts of the present document as well.

The predictor 330 may perform the prediction of the current block, and generate a predicted block including the prediction samples of the current block. The predictor may determine whether the intra prediction is applied or the inter prediction is applied to the current block based on the information on prediction output from the entropy decoder 310, and determine a specific intra/inter prediction mode.

The predictor 330 may generate a prediction signal based on various prediction methods to be described later. For example, the predictor may apply intra prediction or inter prediction for prediction of one block, and may simultaneously apply intra prediction and inter prediction. This may be called combined inter and intra prediction (CIIP). In addition, the predictor may be based on an intra block copy (IBC) prediction mode or based on a palette mode for prediction of a block. The IBC prediction mode or the palette mode may be used for image/video coding of content such as games, for example, screen content coding (SCC). IBC may basically perform prediction within the current picture, but may be performed similarly to inter prediction in that a reference block is derived within the current picture. That is, IBC may use at least one of the inter prediction techniques described in the present document. The palette mode may be considered as an example of intra coding or intra prediction. When the palette mode is applied, information on the palette table and the palette index may be included in the video/image information and signaled.

The intra predictor 331 may predict the current block by referring to the samples in the current picture. The referred samples may be located in the neighborhood of the current block, or may be located apart from the current block according to the prediction mode. In intra prediction, prediction modes may include a plurality of non-directional modes and a plurality of directional modes. The intra predictor 331 may determine the prediction mode to be applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information being transmitted in the inter prediction mode, motion information may be predicted in the unit of blocks, subblocks, or samples based on correlation of motion information between the neighboring block and the current block. The motion information may include a motion vector and a reference picture index. The motion information may further include information on inter prediction direction (L0 prediction, L1 prediction, Bi prediction, and the like). In case of inter prediction, the neighboring block may include a spatial neighboring block existing in the current picture and a temporal neighboring block existing in the reference picture. For example, the inter predictor 332 may construct a motion information candidate list based on neighboring blocks, and derive a motion vector of the current block and/or a reference picture index based on the received candidate selection information. Inter prediction may be performed based on various prediction modes, and the information on the prediction may include information indicating a mode of inter prediction for the current block. The adder 340 may generate a reconstructed signal (reconstructed picture, reconstructed block, or reconstructed sample array) by adding the obtained residual signal to the prediction signal (predicted block or predicted sample array) output from the predictor (including inter predictor 332 and/or intra predictor 331). If there is no residual for the processing target block, such as a case that a skip mode is applied, the predicted block may be used as the reconstructed block.

The adder 340 may be called a reconstructor or a reconstructed block generator. The generated reconstructed signal may be used for the intra prediction of a next block to be processed in the current picture, and as described later, may also be output through filtering or may also be used for the inter prediction of a next picture.

Meanwhile, a luma mapping with chroma scaling (LMCS) may also be applied in the picture decoding process.

The filter 350 may improve subjective/objective image quality by applying filtering to the reconstructed signal. For example, the filter 350 may generate a modified reconstructed picture by applying various filtering methods to the reconstructed picture, and store the modified reconstructed picture in the memory 360, specifically, in a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture having already been reconstructed. The stored motion information may be transferred to the inter predictor 332 so as to be utilized as the motion information of the spatial neighboring block or the motion information of the temporal neighboring block. The memory 360 may store reconstructed samples of reconstructed blocks in the current picture, and transfer the reconstructed samples to the intra predictor 331.

In the present document, the embodiments described in the filter 260, the inter predictor 221, and the intra predictor 222 of the encoding apparatus 200 may be applied equally or to correspond to the filter 350, the inter predictor 332, and the intra predictor 331.

Figure 4:
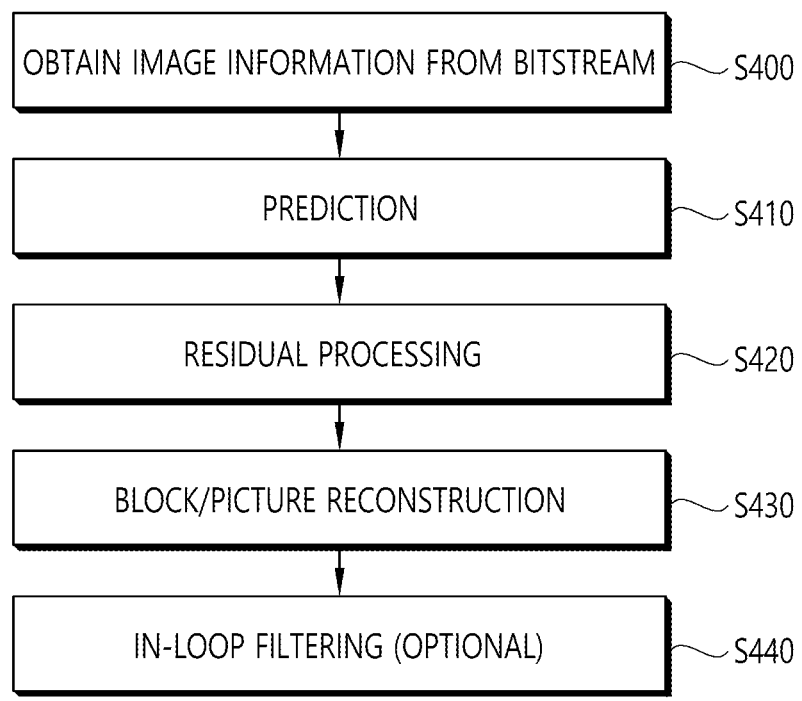
FIG. 4 illustrates an example of a schematic picture decoding procedure to which an embodiment of the present document is applicable.

FIG. 4 illustrates an example of a schematic picture decoding procedure to which an embodiment of the present document is applicable.

In image/video coding, a picture constituting image/video may be encoded/decoded in accordance with a series of decoding orders. A picture order corresponding to an output order of a decoded picture may be configured different from the decoding order, and based on this, not only forward prediction but also backward prediction may be performed during inter prediction.

In FIG. 4, S400 may be performed by the entropy decoder 310 of the decoding apparatus as described above in FIG. 3, S410 may be performed by the predictor 330, S420 may be performed by the residual processor 320, S430 may be performed by the adder 340, and S440 may be performed by the filter 350. S400 may include an information decoding procedure described in the present document, S410 may include an inter/intra prediction procedure described in the present document, S420 may include a residual processing procedure described in the present document, S430 may include a block/picture reconstruction procedure described in the present document, and S440 may include an in-loop filtering procedure described in the present document.

Referring to FIG. 4, a picture decoding procedure, as indicated in the description for FIG. 3, may schematically include an image/video information obtaining procedure (S400) from the bitstream (through decoding), a picture reconstruction procedure (S410 to S430), and an in-loop filtering procedure (S440) for a reconstructed picture. The picture reconstruction procedure may be performed based on prediction samples and residual samples obtained through inter/intra prediction (S410) and residual processing (dequantization and inverse transform for quantized transform coefficients) (S420) explained in the present document. A modified reconstructed picture may be generated through the in-loop filtering procedure for the reconstructed picture generated through the picture reconstruction procedure, and the modified reconstructed picture may be output as a decoded picture, and may also be stored in the decoded picture buffer or the memory 360 of the decoding apparatus to be used as a reference picture in the inter prediction procedure after the picture decoding. In some cases, the in-loop filtering procedure may be skipped, and in this case, the reconstructed picture may be output as the decoded picture, and may also be stored in the decoded picture buffer or the memory 360 of the decoding apparatus to be used as the reference picture in the inter prediction procedure after the picture decoding. As described above, the in-loop filtering procedure (S440) may include the deblocking filtering procedure, the sample adaptive offset (SAO) procedure, the adaptive loop filter (ALF) procedure, and/or the bi-lateral filter procedure, and some or all of the procedures may be skipped. Further, one or some of the deblocking filtering procedure, the sample adaptive offset (SAO) procedure, the adaptive loop filter (ALF) procedure, and/or the bi-lateral filter procedure may be sequentially applied, or all of the procedures may be sequentially applied. For example, the SAO procedure may be performed after the deblocking filtering procedure is applied to the reconstructed picture. Further, for example, the ALF procedure may be performed after the deblocking filtering procedure is applied to the reconstructed picture. This may also performed in the same manner even in the encoding apparatus.

Figure 5:
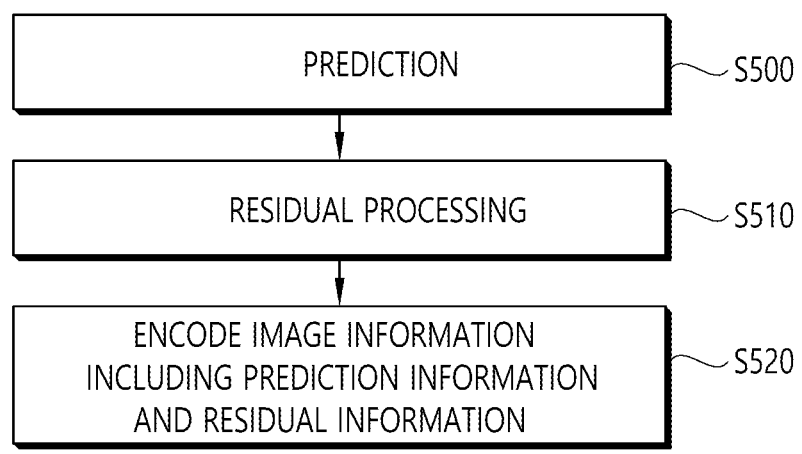
FIG. 5 illustrates an example of a schematic picture encoding procedure to which an embodiment of the present document is applicable.

FIG. 5 illustrates an example of a schematic picture encoding procedure to which an embodiment of the present document is applicable.

In FIG. 5, S500 may be performed by the predictor 220 of the encoding apparatus as described above in FIG. 2, S510 may be performed by the residual processor 230, and S520 may be performed by the entropy encoder 240. The S500 may include the inter/intra prediction procedure explained in the present document, S510 may include the residual processing procedure explained in the present document, and S520 may include the information encoding procedure explained in the present document.

Referring to FIG. 5, the picture encoding procedure may schematically include not only the procedure of encoding information for picture reconstruction (e.g., prediction information, residual information, and partitioning information) as represented in the explanation for FIG. 2 to output the encoded information in the form of a bitstream, but also the procedure of generating the reconstructed picture for the current picture and the procedure (optional) of applying the in-loop filtering to the reconstructed picture. The encoding apparatus may derive (modified) residual samples from quantized transform coefficients through the dequantizer 234 and the inverse transformer 235, and may generate the reconstructed picture based on the prediction samples being output in S500 and the (modified) residual samples. The reconstructed picture generated as above may be the same as the reconstructed picture generated in the above-described decoding apparatus. The modified reconstructed picture may be generated through the in-loop filtering procedure for the reconstructed picture, and may be stored in the decoded picture buffer or the memory 270, and in the same manner as in the decoding apparatus, the modified reconstructed picture may be used as the reference picture in the inter prediction procedure during the picture encoding. As described above, in some cases, some or all of the in-loop filtering procedures may be skipped. In case that the in-loop filtering procedures are performed, (in-loop) filtering related information (parameter) may be encoded in the entropy encoder 240, and may be output in the form of the bitstream, and the decoding apparatus may perform the in-loop filtering procedures in the same method as in the encoding apparatus based on the filtering related information.

Through the above in-loop filtering procedures, noise, such as blocking artifact and ringing artifact, occurring during image/video coding can be reduced, and the subjective/objective visual quality can be enhanced. Further, by performing the in-loop filtering procedure in both the encoding apparatus and the decoding apparatus, the same prediction result can be derived in the encoding apparatus and the decoding apparatus, and thus the picture coding reliability can be enhanced, and the amount of data to be transmitted for the picture coding can be reduced.

As described above, in not only the decoding apparatus but also the encoding apparatus, the picture reconstruction procedure may be performed. A reconstructed block may be generated based on intra prediction/inter prediction in each block unit, and a reconstructed picture including reconstructed blocks may be generated. In case that the current picture/slice/tile group is an I picture/slice/tile group, blocks included in the current picture/slice/tile group may be reconstructed based on only the intra prediction. Meanwhile, in case that the current picture/slice/tile group is a P or B picture/slice/tile group, the blocks included in the current picture/slice/tile group may be reconstructed based on the intra prediction or the inter prediction. In this case, the inter prediction may be applied for some blocks in the current picture/slice/tile group, and the intra prediction may be applied for the remaining other blocks. Color components of the picture may include luma components and chroma components, and unless being explicitly constrained in the present document, methods and embodiments proposed in the present document may be applied to the luma components and the chroma components.

Figure 6:
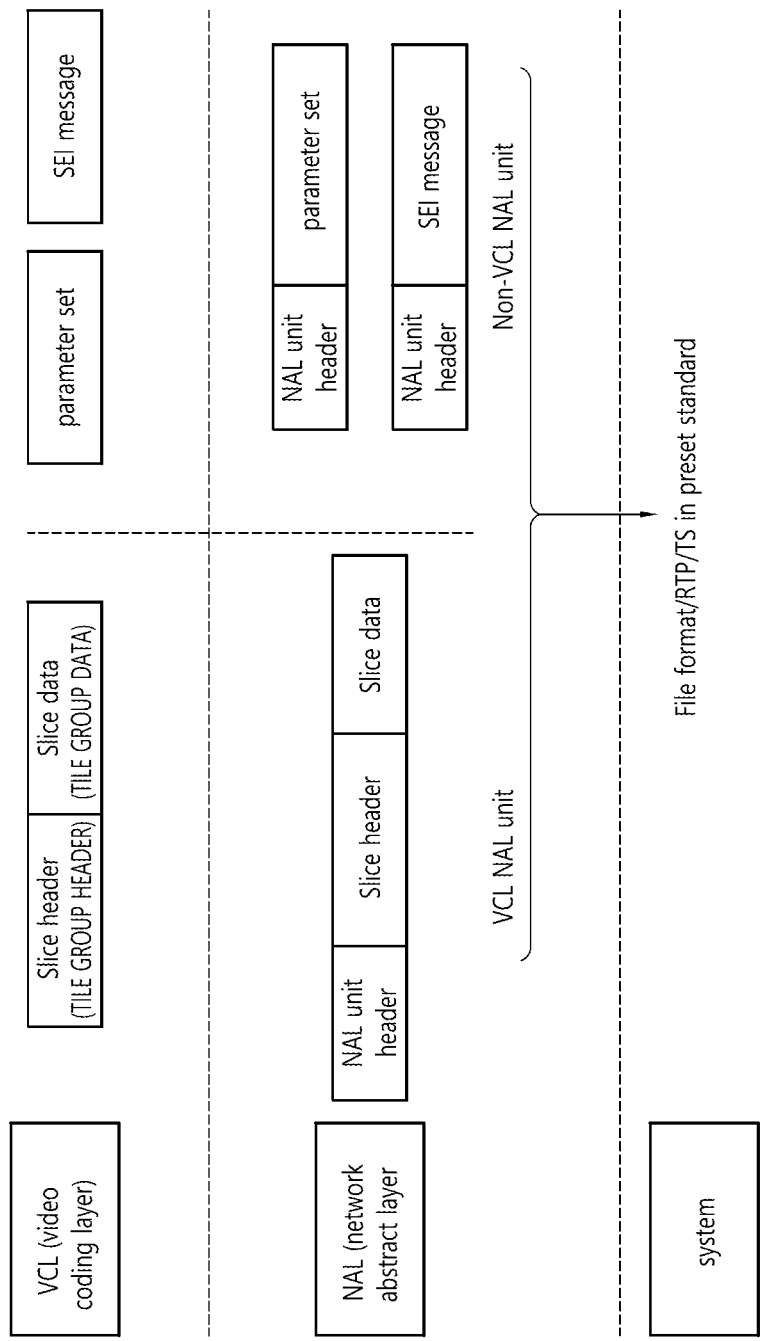
FIG. 6 exemplarily illustrates a hierarchical structure for coded image/video.

FIG. 6 exemplarily shows a hierarchical structure for a coded image/video.

Referring to FIG. 6, the coded image/video is divided into VCL (video coding layer) that deals with an image/video decoding process and itself, a subsystem that transmits and stores the coded information, and a network abstraction layer (NAL) that exists between the VCL and subsystems and is responsible for network adaptation functions.

The VCL may generate VCL data including compressed image data (slice data), or generate parameter sets including a picture parameter set (Picture Parameter Set: PPS), a sequence parameter set (Sequence Parameter Set: SPS), a video parameter set (Video Parameter Set: VPS) etc. or a supplemental enhancement information (SEI) message additionally necessary for the decoding process of an image.

In the NAL, a NAL unit may be generated by adding header information (NAL unit header) to a raw byte sequence payload (RBSP) generated in the VCL. In this case, the RBSP refers to slice data, parameter sets, SEI messages, etc. generated in the VCL. The NAL unit header may include NAL unit type information specified according to RBSP data included in the corresponding NAL unit.

As shown in the figure, the NAL unit may be divided into a VCL NAL unit and a Non-VCL NAL unit according to the RBSP generated in the VCL. The VCL NAL unit may mean a NAL unit including information (sliced data) about an image, and the Non-VCL NAL unit may mean a NAL unit containing information (parameter set or SEI message) necessary for decoding an image.

The above-described VCL NAL unit and Non-VCL NAL unit may be transmitted through a network by attaching header information according to a data standard of the subsystem. For example, the NAL unit may be transformed into a data form of a predetermined standard such as H.266/VVC file format, Real-time Transport Protocol (RTP), Transport Stream (TS), etc. and transmitted through various networks.

As described above, in the NAL unit, the NAL unit type may be specified according to the RBSP data structure included in the corresponding NAL unit, and information on this NAL unit type may be stored and signaled in the NAL unit header.

For example, the NAL unit may be roughly classified into the VCL NAL unit type and the Non-VCL NAL unit type depending on whether the NAL unit includes information about the image (slice data). The VCL NAL unit type may be classified according to property and a type of a picture included in the VCL NAL unit, and the Non-VCL NAL unit type may be classified according to the type of a parameter set.

The following is an example of the NAL unit type specified according to the type of parameter set included in the Non-VCL NAL unit type.

DCI (Decoding Capability Information) NAL unit: Type for NAL unit including DCI

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

APS (Adaptation Parameter Set) NAL unit: Type for NAL unit including APS

PH (Picture header) NAL unit: Type for NAL unit including PH

The above-described NAL unit types have syntax information for the NAL unit type, and the syntax information may be stored and signaled in the NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DCI (DCI syntax) may include information/parameters related to decoding capability.

In the present document, a high level syntax (HLS) may include at least one of the APS syntax, PPS syntax, SPS syntax, VPS syntax, decoding capability information (DCI) syntax, picture header syntax, and slice header syntax. Meanwhile, in the present document, a low level syntax (LLS) may include, for example, a slice data syntax, CTU syntax, coding unit syntax, and transform unit syntax.

In the present document, the image/video information being encoded and signaled in the form of the bitstream from the encoding apparatus to the decoding apparatus may include not only partitioning related information in a picture, intra/inter prediction information, residual information, and in-loop filtering information, but also the slice header information, picture header information, APS information, PPS information, SPS information, VPS information, and/or DCI information. Further, the image/video information may further include general constraint information and/or NAL unit header information.

Meanwhile, as described information, the video/image information of the present document may include high level signaling, and the video/image coding method may be performed based on the video/image information.

The coded picture may include one or more slices. Parameters describing the coded picture may be signaled in the picture header, and parameters describing the slice may be signaled in the slice header. The picture header (PH) is carried in its own NAL unit type. The slice header is present in a starting part of a NAL unit including a payload of the slice (slice data).

Further, the picture may be divided into subpictures, tiles, and/or slices. The signaling for the subpictures is present in the SPS, the signaling for the tile and a rectangular slice is present in the PPS, and lastly, the signaling for a raster scan slice is present in the slice header.

Meanwhile, signaling of profile, tier, and level information may be present in the VPS and/or the SPS as in the following Table 1 and Table 2.

TABLE 1

| | Descriptor |
|---|---|
| video_parameter_set_rbsp( ) { | |
|   vps_video_parameter_set_id | u(4) |

TABLE 1-continued

| | Descriptor |
|---|---|
|   vps_max_layers_minus1 | u(6) |
|   vps_max_sublayers_minus1 | u(3) |
|   ... | |
|   vps_num_ptls_minus1 | u(8) |
|   for( i = 0; i <= vps_num_ptls_minus1; i++ ) { | |
|     if( i > 0 ) | |
|       vps_pt_present_flag[ i ] | u(1) |
|     if( !vps_all_layers_same_num_sublayers_flag ) | |
|       vps_ptl_max_temporal_id[ i ] | u(3) |
|   } | |
|   while( !byte_aligned( ) ) | |
|     vps_ptl_alignment_zero_bit /* equal to 0 */ | f(1) |
|   for( i = 0; i <= vps_num_ptls_minus1; i++ ) | |
|     profile_tier_level( vps_pt_present_flag[ i ], | |
|     vps_ptl_max_temporal_id[ i ] ) | |
|   for( i = 0; i < TotalNumOlss; i++ ) | |
|     if( vps_num_ptls_minus1 > 0 && | |
|     vps_num_ptls_minus1 + 1 != TotalNumOlss ) | |
|       vps_ols_ptl_idx[ i ] | u(8) |
|   ... | |
| } | |

In Table 1, the vps_video_parameter_set_id provides an identifier for the VPS so as to be referred to in another syntax element. The value of the vps_video_parameter_set_id should be larger than 0.

The vps_max_layers_minus1+1 represents the maximum allowed number of layers in each coded video sequence (VCS) referring to the VPS.

The vps_max_sublayers_minus1 plus 1 represents the maximum number of temporal sublayers that may be present in the layer of each CVS referring to the VPS. The value of the vps_max_sublayers_minus1 should be in the range of 0 to 6.

The vps_num_ptls_minus1+1 represents the number of profile_tier_level ( ) syntax structures in the VPS. The value of the vps_num_ptls_minus1 should be smaller than the TotalNumOlss representing the number of all output layer sets (OLS).

If the value of the vps_pt_present_flag [i] is 1, this represents that the profile, tier, and general constraint information are present in the i-th profile_tier_level ( ) syntax structure in the VPS. If the value of the vps_pt_present_flag [i] is 0, this represents that the profile, tier, and general constraint information are not present in the i-th profile_tier_level ( ) syntax structure in the VPS.

The value of the vps_pt_present_flag [0] is inferred as 1. If the value of the vps_pt_present_flag [i] is 0, it is inferred that the profile, tier, and general constraint information for the i-th profile_tier_level ( ) syntax structure in the VPS is the same as that of the (i−1)-th profile_tier_level ( ) syntax structure in the VPS.

The vps_ptl_max_temporal_id [i] represents TemporalId of the uppermost sublayer expression whereby level information is present in the i-th profile_tier_level ( ) syntax structure in the VPS. The value of the vps_ptl_max_temporal_id [i] should be present in a range of 0 to the vps_max_sublayers_minus1. If being not present, it is inferred that the value of the vps_ptl_max_temporal_id [i] is the same of the value of the vps_max_sublayers_minus1.

The value of the vps_ptl_alignment_zero_bit is equal to 0.

The vps_ols_ptl_idx [i] represents an index of the profile_tier_level ( ) syntax structure that is applied to the i-th OLS in the VPS for a profile_tier_level ( ) syntax structure list. If being present, the value of the vps_ols_ptl_idx [i] should be present in a range of 0 to the vps_num_ptls_minus1.

If being not present, the value of the vps_ols_ptl_idx [i] is inferred as follows.
  If the value of the vps_num_ptls_minus1 is 0, the value of the vps_ols_ptl_idx [i] is inferred as 0.
  Otherwise (if the value of the vps_num_ptls_minus1 is larger than 0, and the vps_num_ptls_minus1+1 is equal to TotalNumOlss), the value of the vps_ols_ptl_idx [i] is inferred to be equal to i.
If the value of the NumLayersInOls [i] is 1, the profile_tier_level ( ) syntax structure being applied to the i-th OLS is present even in the SPS being referred to by the layer in the i-th OLS. If the value of the NumLayersInOls [i] is 1, the requirements of bitstream compatibility should be a case that the profile_tier_level ( ) syntax structures being signaled in the VPS and the SPS for the i-th OLS are the same.
Each profile_tier_level ( ) syntax structure in the VPS should be referred to within a range of 0 to TotalNumOlss−1 by at least one value for i.

TABLE 2

| | Descriptor |
|---|---|
| seq_parameter_set_rbsp( ) { | |
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile tier level( 1, sps max sublayers minus1 ) | |
|   ... | |
| } | |

Referring to Table 2, the sps_seq_parameter_set_id provides an identifier for the SPS so as to be referred to by other syntax elements.

The SPS NAL units share the same value space as that of the sps_seq_parameter_set_id regardless of the value of the nuh_layer_id.

The spsLayerId is called the nuh_layer_id value of a specific SPS NAL unit, and the vclLayerId is called the nuh_layer_id value of a specific VCL NAL unit. The specific VCL NAL unit does not refer to the specific NAL unit unless the spsLayerId is smaller than or equal to the vclLayerId, and the nuh_layer_id includes even a layer in which all OLSs designated by the VPS including the same layer as that of the vclLayerId have the same nuh_kayer_id as that of the spslayerId.

If the value of the sps_video_parameter_set_id is larger than 0, this represents the vps_video_parameter_set_id value for the VPS being referred to by the SPS.

If the value of the sps_video_parameter_set_id is 0, the followings are applied.
  The SPS does not refer to the VPS, and when each coded layer video sequence (CLVS) referring to the SPS is decoded, the VPS is not referred to.
  The value of the vps_max_layers_minus1 is inferred as 0.
  The value of the vps_max_sublayers_minus1 is inferred as 6.
  The CVS should include only one layer (i.e., all VCL NAL units in the CVS have the same nuh_layer_id value).
  The value of the GeneralLayerIdx [nuh_layer_id] is inferred as 0.
  The value of the vps_independent_layer_flag [GeneralLayerIdx [nuh_layer_id]] is inferred as 1.
If the value of the vps_independent_layer_flag [GeneralLayerIdx [nuh_layer_id]] is 1, the SPS being referred to by the CLVS having the nuhLayerId of the specific nuh_layer_id value should have the same nuh_layer_id as that of the nuhLayerId.

The value of the sps_video_parameter_set_id should be the same in all SPSs being referred to by the CLVSs in the CVS.

The sps_max_sublayers_minus1 plus 1 represents the maximum number of temporal sublayers that can be present in each CLVS referring to the SPS. The value of the sps_max_sublayers_minus1 should be in a range of 0 to vps_max_sublayers_minus1.

The sps_reserved_zero_4bits is equal to 0.

If the value of the sps_ptl_dpb_hrd_params_present_flag is 1, this may represent that the profile_tier_level ( ) syntax structure and the dpb_parameters ( ) syntax structure are present in the SPS, and the general_hrd_parameters ( ) syntax structure and the ols_hrd_parameters ( ) syntax structure are present in the SPS. If the value of the sps_ptl_dpb_hrd_params_present_flag is 0, this represents that the four syntax structures as described above are not present in the SPS.

If the value of the sps_video_parameter_set_id is larger than 0 and the OLS, in which the nuh_layer_id includes only one layer that is the same as that of the nuh_layer_id of the SPS, is present, or the value of the sps_video_parameter_set_id is 0, the value of the sps_ptl_dpb_hrd_params_present_flag is the same as 1.

Meanwhile, the syntax structure of the PTL (profile, tier, level) information may be as follows.

TABLE 3

| | Descriptor |
|---|---|
| profile_tier_level( profileTierPresentFlag, maxNumSubLayersMinus1 ) { | |
|   if( profileTierPresentFlag ) { | |
|     general_profile_idc | u(7) |
|     general_tier_flag | u(1) |
|     general_constraint_info( ) | |
|   } | |
|   general_level_idc | u(8) |
|   if( profileTierPresentFlag ) { | |
|     ptl_num_sub_profiles | u(8) |
|     for( i = 0; i < ptl_num_sub_profiles; i++ ) | |
|       general_sub_profile_idc[ i ] | u(32) |
|   } | |
|   for( i = 0; i < maxNumSubLayersMinus1; i++ ) | |
|     ptl_sublayer_level_present_flag[ i ] | u(1) |
|   while( !byte_aligned( ) ) | |
|     ptl_alignment_zero_bit | f(1) |
|   for( i = 0; i < maxNumSubLayersMinus1; i++ ) | |
|     if( ptl_sublayer_level_present_flag[ i ] ) | |
|       sublayer_level_idc[ i ] | u(8) |
| } | |

Referring to Table 3, the profile_tier_level ( ) syntax structure provides level information, and selectively provide the profile, tier, sub-profile, and general constraint information.

If the profile_tier_level ( ) syntax structure is included in the VPS, the OlsInScope is one or more OLSs specified by the VPS. If the profile_tier_level ( ) syntax structure is included in the SPS, the OlsInScope is the OLS including only the lowermost layer among the layers referring to the SPS, and the lowermost layer is an independent layer.

The general_profile_idc represent the profile with which the OlsInScope complies.

The general_tier_flag represents a tier context for interpretation of the general_level_idc.

The general_level_idc represents the level with which the OlsInScope complies.

As the value of the general_level_idc becomes larger, a higher level is represented. The maximum level being signaled in the DCI NAL unit for the OlsInScope may be higher than the level being signaled in the SPS for the CLVS included in the OlsInScope, but cannot be lower than the same.

In case that the OlsInScope complies with several profiles, the general_profile_idc represents the profile providing the preferred decoding result or the preferred bitstream identification as determined by the encoding apparatus.

In case that the CVSs of the OlsInScope conform with different profiles, several profile_tier_level ( ) syntax structures may be included in the DCI NAL unit so that at least one set of the profile, tier, and level for the decoding apparatus that can decode each CVS of the OlsInScope is present.

The num_sub_profiles represents the number of general_sub_profile_idc [i] syntax elements.

The general_sub_profile_idc [i] represents the i-th interoperability metadata.

If the value of the sublayer_level_present_flag [i] is 1, this represents that the level information is present in the profile_tier_level ( ) syntax element for expression of the sublayer in which the TemporalId is i. If the value of the sublayer_level_present_flag [i] is 0, this represents that the level information is not present in the profile_tier_level ( ) syntax structure for the expression of the sublayer in which the TemporalId is i.

The value of the ptl_alignment_zero_bits is the same as 0.

The semantics of the syntax element of the sublayer_level_idc [i] are the same as those of the general_level_idc syntax element, but are applied to the expression of the sublayer in which the TemporalId is i.

In case of being not present, the value of the sublayer_level_idc [i] is inferred as follows.

The sublayer_level_idc [maxNumSubLayersMinus1] is inferred to be the same as the general_level_idc having the same profile_tier_level ( ) structure.

In the maxNumSubLayersMinus1−1, the sublayer_level_idc [i] is inferred to be the same as the sublayer_level_idc [i+1] with respect to i in the range including 0 (descending order of i value).

For reference, the sublayer may represent a temporal scalable layer of a temporal scalable bitstream composed of VCL NAL units having a TemporalId variable of a specific value and related non-VCL NAL units. The sublayer expression may be a subset of bitstream composed of NAL units of a specific sublayer and lower sublayers.

The general_constraint_info ( ) may include the following syntax elements.

TABLE 4

| | Descriptor |
| --- | --- |
| general_constraint_info( ) { | |
|   general_non_packed_constraint_flag | u(1) |
|   general_frame_only_constraint_flag | u(1) |
|   general_non_projected_constraint_flag | u(1) |
|   general_one_picture_only_constraint_flag | u(1) |
|   intra_only_constraint_flag | u(1) |
|   max_bitdepth_constraint_idc | u(4) |
|   max_chroma_format_constraint_idc | u(2) |
|   single_layer_constraint_flag | u(1) |
|   all_layers_independent_constraint_flag | u(1) |
|   no_ref_pic_resampling_constraint_flag | u(1) |
|   no_res_change_in_clvs_constraint_flag | u(1) |

TABLE 4-continued

| | Descriptor |
| --- | --- |
|   one_tile_per_pic_constraint_flag | u(1) |
|   pic_header_in_slice_header_constraint_flag | u(1) |
|   one_slice_per_pic_constraint_flag | u(1) |
|   one_subpic_per_pic_constraint_flag | u(1) |
|   no_qtbtt_dual_tree_intra_constraint_flag | u(1) |
|   no_partition_constraints_override_constraint_flag | u(1) |
|   no_sao_constraint_flag | u(1) |
|   no_alf_constraint_flag | u(1) |
|   no_ccalf_constraint_flag | u(1) |
|   no_joint_cbcr_constraint_flag | u(1) |
|   no_mrl_constraint_flag | u(1) |
|   no_isp_constraint_flag | u(1) |
|   no_mip_constraint_flag | u(1) |
|   no_ref_wraparound_constraint_flag | u(1) |
|   no_temporal_mvp_constraint_flag | u(1) |
|   no_sbtmvp_constraint_flag | u(1) |
|   no_amvr_constraint_flag | u(1) |
|   no_bdof_constraint_flag | u(1) |
|   no_dmvr_constraint_flag | u(1) |
|   no_cclm_constraint_flag | u(1) |
|   no_mts_constraint_flag | u(1) |
|   no_sbt_constraint_flag | u(1) |
|   no_lfnst_constraint_flag | u(1) |
|   no_affine_motion_constraint_flag | u(1) |
|   no_mmvd_constraint_flag | u(1) |
|   no_smvd_constraint_flag | u(1) |
|   no_prof_constraint_flag | u(1) |
|   no_bcw_constraint_flag | u(1) |
|   no_ibc_constraint_flag | u(1) |
|   no_ciip_constraint_flag | u(1) |
|   no_gpm_constraint_flag | u(1) |
|   no_ladf_constraint_flag | u(1) |
|   no_transform_skip_constraint_flag | u(1) |
|   no_bdpcm_constraint_flag | u(1) |
|   no_palette_constraint_flag | u(1) |
|   no_act_constraint_flag | u(1) |
|   no_lmcs_constraint_flag | u(1) |
|   no_cu_qp_delta_constraint_flag | u(1) |
|   no_chroma_qp_offset_constraint_flag | u(1) |
|   no_dep_quant_constraint_flag | u(1) |
|   no_sign_data_hiding_constraint_flag | u(1) |
|   no_tsrc_constraint_flag | u(1) |
|   no_mixed_nalu_types_in_pic_constraint_flag | u(1) |
|   no_trail_constraint_flag | u(1) |
|   no_stsa_constraint_flag | u(1) |
|   no_rasl_constraint_flag | u(1) |
|   no_radl_constraint_flag | u(1) |
|   no_idr_constraint_flag | u(1) |
|   no_cra_constraint_flag | u(1) |
|   no_gdr_constraint_flag | u(1) |
|   no_aps_constraint_flag | u(1) |
|   while( !byte_aligned( ) ) | |
|     gci_alignment_zero_bit | f(1) |
|   gci_num_reserved_bytes | u(8) |
|   for( i = 0; i < gci_num_reserved_bytes; i++ ) | |
|     gci_reserved_byte[ i ] | u(8) |
| } | |

Referring to Table 3, signaling of a level indicator (i.e., general_level_idc) is present after signaling of general constraint information (general_constraint_info). Accordingly, if general constraint information is present in the PTL information, the decoding apparatus should first parse the general constraint information, and thus parsing of the level indicator becomes complicated. Further, since the general constraint information may not be necessary in the decoding apparatus, the decoding apparatus may desire to skip the parsing of the general constraint information. However, according to Table 3, if the general constraint information is present in the PTL information, the parsing thereof is unable to be skipped.

Further, the signaling of the general constraint information is always present in the PTL information when the value of the profileTierPresentFlag is 1. However, the general constraint information does not always have to be present in the PTL information when the profile, tier, and level information are present. Accordingly, there is a need for a mechanism not to signal the general constraint information even in case that the PTL information is present.

Further, the signaling of the general constraint information is present in the middle of the signal of the profile, tier, and level information. This imposes a burden on decoding information to process the profile, tier, and level information separately from the processing of the general constraint information.

The following drawings have been prepared to explain a specific example of the present document. The name of a specific device described in the drawings or the number of a specific signal/information has been exemplarily presented, and thus the technical feature of the present specification is not limited to the specific name used in the following drawings.

In order to solve the above-described problems, the present document provides the following methods. The respective methods may be applied independently or in combination.

1. In the profile, tier, and level structure (PTL structure), a level indicator may be signaled before a syntax element whose presence is conditioned. For example, In the PTL information, the general_level_idc may be signaled prior to the general_profile_idc.
2. A flag representing whether flag(s) being signaled for the general constraint information (GCI) are present may be added. This flag may be called a gci_present_flag. The flag(s) for the general constraint information include syntax elements specified in Table 4 and those yet to be reserved.
3. The total number of bits for general constraint information including the gci_present_flag is designated in the unit of a byte (i.e., the number of bits is a multiple of 8).
4. The bits reserved for a general constraint flag starts at a byte-aligned position. As a result, there may be some bits being present for byte alignment before reserved bits are present.
5. In addition to a new flag gci_present_flag, a syntax element representing the number of reserved bytes in a GCI structure may be changed to represent the number of general constraint flag (including reserved bit and flag), and may be first signaled just below the gci_present_flag in the GCI structure. The syntax element may be called gci_num_constraint_bytes. If the value of the gci_present_flag is 0, the value of the gci_num_constraint_bytes is 0. The number of bits for signaling of the gci_present_flag and the gci_num_constraint_bytes may be byte-aligned. For example, the number of bits for signaling of the gci_num_constraint_bytes may become 7.
6. As an alternative for Item 4, it is not necessary for the reserved bits for the general constraint flag to start at the byte-aligned position. As a result, this eliminates the need to have the byte-aligned bit before the presence of the reserved bits.
7. As an alternative for Item 1, the profile, tier, and level information may be signaled in a method in which they are not separated by other syntax elements. This may be implemented by moving the signaling of the general constraint information to the position after the signaling of the level information.
8. As an alternative for Item 5, the signaling of the gci_num_constraint_bytes may replace the gci_present_flag without being added to the gci_present_flag.
9. The syntax structure (general_constraint_info ( )) of the general constraint information is present in the profile tier level structure (profile_tier_level syntax) after signaling of the profile, tier, and level information including the profile, tier, and level information for the sublayers.
10. In case that the syntax structure of the general constraint information is present in the end of the profile tier level structure, the size of the general constraint information may or may not be byte-aligned.

As an embodiment, the encoding apparatus may signal the profile_tier_level syntax having the structure of the following Table 5, and semantics therefor may be as in the following Table 6.

TABLE 5

| | Descriptor |
|---|---|
| profile_tier_level( profileTierPresentFlag, maxNumSubLayersMinus1 ) { | |
|   general_level_idc | u(8) |
|   if( profileTierPresentFlag ) { | |
|     general_profile_idc | u(7) |
|     general_tier_flag | u(1) |
|     general_constraint_info( ) | |
|     ptl_num_sub_profiles | u(8) |
|     for( i = 0; i < ptl_num_sub_profiles; i++ ) | |
|       general_sub_profile_idc[ i ] | u(32) |
|   } | |
|   ... | |
| } | |

TABLE 6 general_level_idc indicates a level to which OlsInScope conforms as specified in Annex A. Bitstreams shall not contain values of general_level_idc other than those specified in Annex A. Other values of general_level_idc are reserved for future use by ITU-T | ISO/IEC.
  NOTE 1 - A greater value of general_level_idc indicates a higher level. The maximum level signalled in the DCI NAL unit for OlsInScope may be higher than but cannot be lower than the level signalled in the SPS for a CLVS contained within OlsInScope.
  NOTE 2 - When OlsInScope conforms to multiple profiles, general_profile_idc should indicate the profile that provides the preferred decoded result or the preferred bitstream identification, as determined by the encoder (in a manner not specified in this Specification).
  NOTE 3 - When the CVSs of OlsInScope conform to different profiles, multiple profile_tier_level( ) syntax structures may be included in the DCI NAL unit such that for each CVS of the OlsInScope there is at least one set of indicated profile, tier, and level for a decoder that is capable of decoding the CVS.
general_profile_idc indicates a profile to which OlsInScope conforms as specified in Annex A. Bitstreams shall not contain values of general_profile_idc other than those specified in Annex A. Other values of general_profile_idc are reserved for future use by ITU-T | ISO/IEC.
general_tier_flag specifies the tier context for the interpretation of general_level_idc as specified in Annex A.

Referring to Table 5 and Table 6, the general_level_idc represents the level with which the OlsInScope complies. As the value of the general_level_idc becomes larger, a higher level is represented. The maximum level being signaled in the DCI NAL unit for the OlsInScope may be higher than the level being signaled in the SPS for the CLVS included in the OlsInScope, but cannot be lower than the same. In case that the OlsInScope complies with several profiles, the general_profile_idc represents the profile providing the preferred decoding result or the preferred bitstream identification as determined by the encoding apparatus. In case that the CVSs of the OlsInScope conform to different profiles, several profile_tier_level syntax structures may be included in the DCI NAL unit so that at least one set of the profile, tier, and level for the decoding apparatus that can decode the CVS with respect to the respective CVSs of the OlsInScope is present.

The general_profile_idc represents the profile with which the OlsInScope complies.

The general_tier_flag represents a tier context for interpretation of the general_level_idc.

The general constraint information (general_constraint_info) may be present next to the profile information (general_profile_idc), the tier information (general_tier_flag), and the level information (general_level_idc) in the profile_tier_level syntax structure of Table 3. Accordingly, the decoding apparatus may separately process the general constraint information after processing the profile, tier, and level information.

Meanwhile, as an example, the encoding apparatus may signal the general_constraint_info syntax having the structure as in the following Table 7.

TABLE 7

| | Descriptor |
|---|---|
| general_constraint_info( ) { | |
|   gci_present_flag | u(1) |
|   if( gci_present_flag ) { | |
|     general_non_packed_constraint_flag | u(1) |
|     ... | u(1) |
|     no_aps_constraint_flag | u(1) |
|     gci_num_reserved_bytes | u(8) |
|   } | |
|   while( ! byte_aligned( ) ) | |
|     gci_alignment_zero_bit | f(1) |
|   for( i = 0; i < gci_num_reserved_bytes; i++ ) | |
|     gci_reserved_byte[ i ] | u(8) |
| } | |

In Table 7, the gci_present_flag represents whether information (general_non_packed_constraint_flag and the like) on the constraints is present in the general_constraint_info syntax (general constraint information).

The gci_num_reserved_bytes represents the number of bytes reserved for the general constraint information.

The gci_alignment_zero_bit is information for byte alignment, and has the value of 0.

The gci_reserved_byte[i] represents the bytes reserved for the general constraint information. The gci_reserved_byte[i] does not exert an influence on the decoding process, and may have a certain value.

For example, the semantics for the gci_present_flag may be as in the following Table 8.

TABLE 8 gci_present_flag equal to 1 specifies that the general constraint flags are present in the profile_tier_level( ) syntax structure when profileTierPresentFlag is equal to 1. gci_present_flag equal to 0 specifies, that the general constraint flags are not present in the profile_tier_level( ) syntax structure.
When gci_present_flag equal to 0 for a profile_tier_level( ) syntax structure with profileTierPresentFlag equal to 1, the value of max_bitdepth_constraint_idc is inferred to be equal to 8, the vlaue of max_chroma_format_constraint_idc is inferred to be equal to 3, and the value of the each of the other syntax elements in the general_constraint_info( ) syntax structure starting from general_non_packed_constraint_flag to no_aps_constraint_flag, inclusive, is inferred to be equal to 0.

Referring to Table 8, if the value of the gci_present_flag is 1, this represents that the general constraint information (flag) is present in the profile_tier_level syntax in case that the value of the profileTierPresentFlag is 1. If the value of the gci_present_flag is 0, this represents that the general constraint information is not present in the profile_tier_level syntax.

If the value of the gci_present_flag is 0 for the profile_tier_level syntax in which the value of the profileTierPresentFlag is 1, it is inferred that the value of the max_bitdepth_constraint_idc is 8, and the value of the max_chroma_format_constraint_idc is 3. Further, it is inferred that the value of other syntax elements (from the general_non_packed_constraint_flag to the no_aps_constraint_flag) in the general_constraint_info syntax is 0.

Accordingly, if the general constraint information is not necessary for coding of the image information, the encoding apparatus may encode the value of the gci_present_flag as 0, and the decoding apparatus may skip parsing of the general constraint information in case that the value of the gci_present_flag is 0.

As another example, the encoding apparatus may signal the general_constraint_info syntax having the structure of the following Table 9.

TABLE 9

| | Descriptor |
|---|---|
| general_constraint_info( ) { | |
|   gci_present_flag | u(1) |
|   gci_num_constraint_bytes | u(7) |
|   if( gci_present_flag ) { | |
|     general_non_packed_constraint_flag | u(1) |
|     ... | u(1) |
|     no_aps_constraint_flag | u(1) |
|     while( !byte_aligned( ) ) | |
|       gci_alignment_zero_bit | f(1) |
|     for( i = 0; i <gci_num_reserved_bytes − 9; i++ ) | |
|       gci_reserved_byte[ i ] | u(8) |
|   } | |
| } | |

In Table 9, the semantics for the gci_present_flag may be as in Table 8, and the semantics for the gci_num_constraint_bytes may be as in the following Table 10.

TABLE 10 gci_num_constraint_bytes specifies the length in bytes of the general constraint flags including the reserved bits, not including the byte used TABLE 10-continued for signalling gci_present_flag and gci_num_constraint_bytes themselves. The value of gci_num_constraint_bytes shall be equal to 0 or equal to 9. Other values of gci_num_constraint_bytes are reserved for future use by ITU-T ISO/IEC and shall not be present in bitstreams conforming to this version of this Specification. When the value of gci_present_flag is equal to 0, the value of gci_num_constraint_bytes shall be equal to 0. Otherwise (i.e., the value of gci_present_flag is not equal to 0), the value of gci_num_constraint_bytes shall not be less than 9.

NOTE-
The value 9 may be changed when the number of specified general constraint flags changes.

Referring to Table 10, the gci_num_constraint_bytes does not include bytes being used to signal the gci_present_flag and the gci_num_constraint_bytes, and represents the length of the general constraint flags including the reserved bits in the unit of a byte. The value of the gci_num_constraint_bytes is 0 or 9. If the value of the gci_present_flag is 0, the value of the gci_num_constraint_bytes is 0. If the value of the gci_present_flag is not 0, the value of the gci_num_constraint_bytes should not be smaller than 9. In case that the number of general constraint flags (information on the general constraint) is changed in signaling the general constraint information, the value of the gci_num_constraint_bytes may be changed to 9.

As another example, the encoding apparatus may signal the general_constraint_info syntax having the structure as in the following Table 11.

TABLE 11

|  | Descriptor |
| --- | --- |
| general_constraint_info( ) { |  |
|   gci_present_flag | u(1) |
|   gci_num_constraint_bytes | u(7) |
|   if( gci_present_flag ) { |  |
|     general_non_packed_constraint_flag | u(1) |
|     ... | u(1) |
|     no_aps_constraint_flag | u(1) |
|     for( i = numSpecifiedFlags; i < (gci_num_reserved_bytes * 8); i++ ) |  |
|       gci_reserved_bit[ i ] | u(1) |
|   } |  |
| } |  |

In Table 11, the value of the numSpecifiedFlags represents the number of specified (unreserved) general constraint flags. This value is 66 (i.e., the number of flags from the general_non_packed_constraint_flag to the no_aps_constraint_flag).

The semantics for the gci_present_flag and the gci_num_constraint_bytes may be as in Table 8 and Table 10, and the semantics for the gci_reserved_bit[i] may be as in the following Table 12.

TABLE 12 gci_reserved_bit[ i ] may have any value. Its presence and value do not affect decoder conformance to profiles specified in this version of this Specification. Decoders conforming to this version of this Specification shall ignore the values of all the gci_reserved_bit[ i ] syntax elements.

Referring to Table 12, the value of the gci_reserved_bit[i] is the value that does not exert an influence on the decoding process, and may have a certain value.

Meanwhile, as another embodiment, the encoding apparatus may signal the profile_tier_level syntax having the structure as in the following Table 13.

TABLE 13

|  | Descriptor |
| --- | --- |
| profile_tier_level( profileTierPresentFlag, maxNumSubLayersMinus1 ) { |  |
|   if( profileTierPresentFlag ) { |  |
|     general_profile_idc | u(7) |
|     general_tier_flag | u(1) |
|   } |  |
|   general_level_idc | u(8) |
|   if( profileTierPresentFlag ) { |  |
|     general_constraint_info( ) |  |
|     ptl_num_sub_profiles | u(8) |
|     for( i = 0; i < ptl_num_sub_profiles; i++ ) |  |
|       general_sub_profile_idc[ i ] | u(32) |
|   } |  |
| ... |  |
| } |  |

Referring to Table 13, the level information (general_level_idc) in the profile_tier_level syntax may be signaled next to the profile information (general_profile_idc) and the tier information (general_tier_flag), and the general constraint information (general_constraint_info) may be signaled next to the level information.

In this case, the encoding apparatus may signal the general_constraint_info syntax having the structure as in the following Table 14 or Table 15.

TABLE 14

|  | Descriptor |
| --- | --- |
| general_constraint_info( ) { |  |
|   gci_present_flag | u(1) |
|   gci_num_constraint_bytes | u(7) |
|   if( gci_present_flag ) { |  |
|     general_non_packed_constraint_flag | u(1) |
|     ... | u(1) |
|     no_aps_constraint_flag | u(1) |
|     for( i = numSpecifiedFlags; i < (gci_num_reserved_bytes * 8); i++ ) |  |
|       gci_reserved_bit[ i ] | u(1) |
|   } |  |
| } |  |

TABLE 15

|  | Descriptor |
| --- | --- |
| general_constraint_info( ) { |  |
|   gci_num_constraint_bytes | u(8) |
|   if( gci_num_constraint_bytes > 0 ) { |  |
|     general_non_packed_constraint_flag | u(1) |
|     ... | u(1) |
|     no_aps_constraint_flag | u(1) |
|     for( i = numSpecifiedFlags; i < (gci_num_reserved_bytes * 8); i++ ) |  |
|       gci_reserved_bit[ i ] | u(1) |
|   } |  |
| } |  |

In Table 15, the gci_num_constraint_bytes represents the number of reserved bytes for information (general constraint flag) on the constraints, does not include the bytes being used to signal the gci_num_constraint_bytes, and represents the length of the general constraint flags including the reserved bits in the unit of a byte. The value of the gci_num_constraint_bytes is 0 or 9.

The gci_reserved_bit[i] may be parsed in the general_constraint_info syntax based on the value of the gci_num_constraint_bytes.

As still another embodiment, the encoding apparatus may signal the profile_tier_level syntax having the structure as in the following Table 16.

TABLE 16

|  | Descriptor |
| --- | --- |
| profile_tier_level( profileTierPresentFlag, maxNumSubLayersMinus1 ) { | |
|   if( profileTierPresentFlag ) { | |
|     general_profile_idc | u(7) |
|     general_tier_flag | u(1) |
|   } | |
|   general_level_idc | u(8) |
|   if( profileTierPresentFlag ) { | |
|     ptl_num_sub_profiles | u(8) |
|     for( i = 0; i < ptl_num_sub_profiles; i++ ) | |
|       general_sub_profile_idc[ i ] | u(32) |
|   } | |
|   for( i = 0; i < maxNumSubLayersMinus1; i++ ) | |
|     ptl_sublayer_level_present_flag[ i ] | u(1) |
|   while( !byte_aligned( ) ) | |
|     ptl_alignment_zero_bit | f(1) |
|   for( i = 0; i < maxNumSubLayersMinus1; i++ ) | |
|     if( ptl_sublayer_level_present_flag[ i ] ) | |
|       sublayer_level_idc[ i ] | u(8) |
|   if( profileTierPresentFlag ) | |
|     general_constraint_info( ) | |
| } | |

Referring to Table 16, the general constraint information may be included in the end of the profile_tier_level syntax.

In this case, the encoding apparatus may signal the general_constraint_info syntax having the structure as in the following Table 17 to Table 19.

TABLE 17

|  | Descriptor |
| --- | --- |
| general_constraint_info( ) { | |
|   gci_present_flag | u(1) |
|   if( gci_present_flag ) { | |
|     general_non_packed_constraint_flag | u(1) |
|     ... | u(1) |
|     no_aps_constraint_flag | u(1) |
|     gci_num_reserved_bits | u(8) |
|     for( i = 0; i < gci_num_reserved_bits; i++ ) | |
|       gci_reserved_bit[ i ] | u(1) |
|   } | |
|   while( !byte_aligned( ) ) | |
|     gci_alignment_zero_bit | f(1) |
| } | |

TABLE 18

|  | Descriptor |
| --- | --- |
| general_constraint_info( ) { | |
|   gci_present_flag | u(1) |
|   if( gci_present_flag) { | |
|     general_non_packed_constraint_flag | u(1) |
|     ... | u(1) |
|     no_aps_constraint_flag | u(1) |
|     gci_num_reserved_bytes | u(8) |
|     for( i = 0; i < gci_num_reserved_bytes; i++ ) | |
|       gci_reserved_byte[ i ] | u(8) |
|   } | |
|   while( !byte_aligned( ) ) | |
|     gci_alignment_zero_bit | f(1) |
| } | |

TABLE 19

|  | Descriptor |
| --- | --- |
| general_constraint_info( ) { | |
|   gci_present_flag | u(1) |
|   if( gci_present_flag ) { | |
|     general_non_packed_constraint_flag | u(1) |
|     ... | u(1) |
|     no_aps_constraint_flag | u(1) |
|     while( !byte_aligned( ) ) | |
|       gci_alignment_zero_bit | f(1) |
|     gci_num_reserved_bytes | u(8) |
|     for( i = 0; i < gci_num_reserved_bytes; i++ ) | |
|       gci_reserved_byte[ i ] | u(8) |
|   } | |
|   while( !byte_aligned( ) ) | |
|     gci_alignment_zero_bit | f(1) |
| } | |

In Table 17, the gci_num_constraint_bits represents the number of bits reserved for the information (general constraint flag) on the general constraint. The gci_reserved_bit[i] may be parsed in the general_constraint_info syntax based on the value of the gci_num_constraint_bits.

Referring to Table 17 to Table 19, the alignment information (gci_alignment_zero_bit) may be present in the end in the general_constraint_info syntax. In other words, the alignment information may be included next to number information (gci_num_constraint_bits or gci_num_constraint_bytes) on the bits reserved for the general constraint information in the general_constraint_info syntax and the reserved bits (gci_reserved_bit[i] or gci_reserved_byte[i]).

As still another embodiment, the encoding apparatus may signal the profile_tier_level syntax having the structure as in the following Table 20.

TABLE 20

|  | Descriptor |
| --- | --- |
| profile_tier_level( profileTierPresentFlag, maxNumSubLayersMinus1 ) { | |
|   if( profileTierPresentFlag ) { | |
|     general_profile_idc | u(7) |
|     general_tier_flag | u(1) |
|   } | |
|   general_level_idc | u(8) |
|   if( profileTierPresentFlag ) { | |
|     ptl_num_sub_profiles | u(8) |
|     for( i = 0; i < ptl_num_sub_profiles; i++ ) | |
|       general_sub_profile_idc[ i ] | u(32) |
|   } | |
|   for( i = 0; i < maxNumSubLayersMinus1; i++ ) | |
|     ptl_sublayer_level_present_flag[ i ] | |
|   while( !byte_aligned( ) ) | |
|     ptl_alignment_zero_bit | f(1) |
|   for( i = 0; i < maxNumSubLayersMinus1; i++ ) | |
|     if( ptl_sublayer_level_present_flag[ i ] ) | |
|       sublayer_level_idc[ i ] | u(8) |
|   if( profileTierPresentFlag ) | |
|     general_constraint_info( ) | |
| } | |

Referring to Table 20, the general constraint information may be present in the end in the profile_tier_level syntax. In other words, the general constraint information may be signaled next to the profile information (general_profile_idc), tier information (general_tier_flag), and level information (general_level_idc) in the profile_tier_level syntax.

In this case, the encoding apparatus may signal the general_constraint_info syntax having the structure as in the following Table 21 to Table 24.

TABLE 21

| | Descriptor |
|---|---|
| general_constraint_info( ) { | |
|   gci_present_flag | u(1) |
|   if( gci_present_flag ) { | |
|     general_non_packed_constraint_flag | u(1) |
|     ... | u(1) |
|     no_aps_constraint_flag | u(1) |
|     gci_num_reserved_bits | u(8) |
|     for( i = 0; i < gci_num_reserved_bits; i++) | |
|       gci_reserved_bit[ i ] | u(1) |
|   } | |
| } | |

TABLE 22

| | Descriptor |
|---|---|
| general_constraint_info( ) { | |
|   gci_present_flag | u(1) |
|   if( gci_present_flag ) { | |
|     general_non_packed_constraint_flag | u(1) |
|     ... | u(1) |
|     no_aps_constraint_flag | u(1) |
|     while( !byte_aligned( ) ) | |
|       gci_alignment_zero_bit | f(1) |
|     gci_num_reserved_bits | u(8) |
|     for( i = 0; i < gci_num_reserved_bits; i++ ) | |
|       gci_reserved_bit[ i ] | u(1) |
|   } | |
| } | |

TABLE 23

| | Descriptor |
|---|---|
| general_constraint_info( ) { | |
|   gci_present_flag | u(1) |
|   if( gci_present_flag ) { | |
|     general_non_packed_constraint_flag | u(1) |
|     ... | u(1) |
|     no_aps_constraint_flag | u(1) |
|     while( !byte_aligned( ) ) | |
|       gci_alignment_zero_bit | f(1) |
|     gci_num_reserved_bytes | u(8) |
|     for( i = 0; i < gci_num_reserved_bytes; i++ ) | |
|       gci_reserved_byte[ i ] | u(8) |
|   } | |
| } | |

TABLE 24

| | Descriptor |
|---|---|
| general_constraint_info( ) { | |
|   gci_present_flag | u(1) |
|   if( gci_present_flag ) { | |
|     general_non_packed_constraint_flag | u(1) |
|     ... | |
|     no_aps_constraint_flag | u(1) |
|     gci_num_reserved_bytes | u(8) |
|     for( i = 0; i < gci_num_reserved_bytes; i++ ) | |
|       gci_reserved_byte[ i ] | u(8) |
|   } | |
| } | |

In Table 21 and Table 22, the gci_num_constraint_bits represents the number of bits reserved for the information on the constraint (general constraint flag). The gci_reserved_bit[i] may be parsed in the general_constraint_info syntax based on the value of the gci_num_constraint_bits.

Referring to Table 21 to Table 24, the bits or bytes reserved for the general constraint information may be included in the end of the general_constraint_info syntax.

Figure 7:
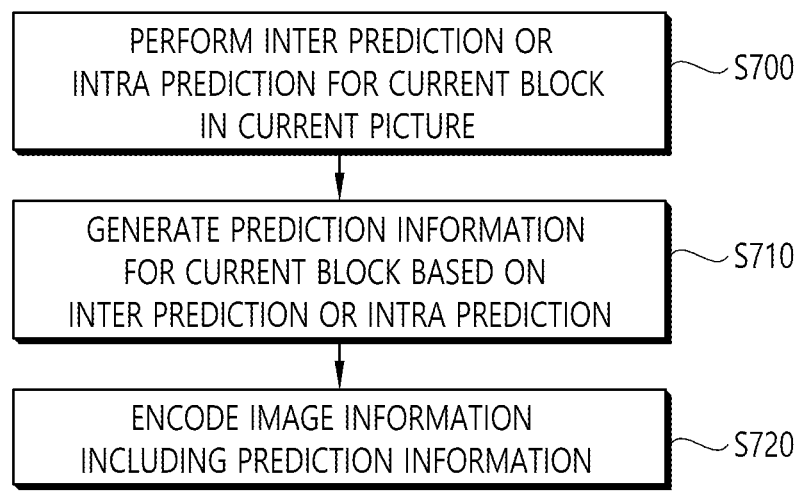
FIGS. 7 and 8 schematically illustrate a video/image encoding method and an example of related components according to an embodiment of the present document.
Figure 8:
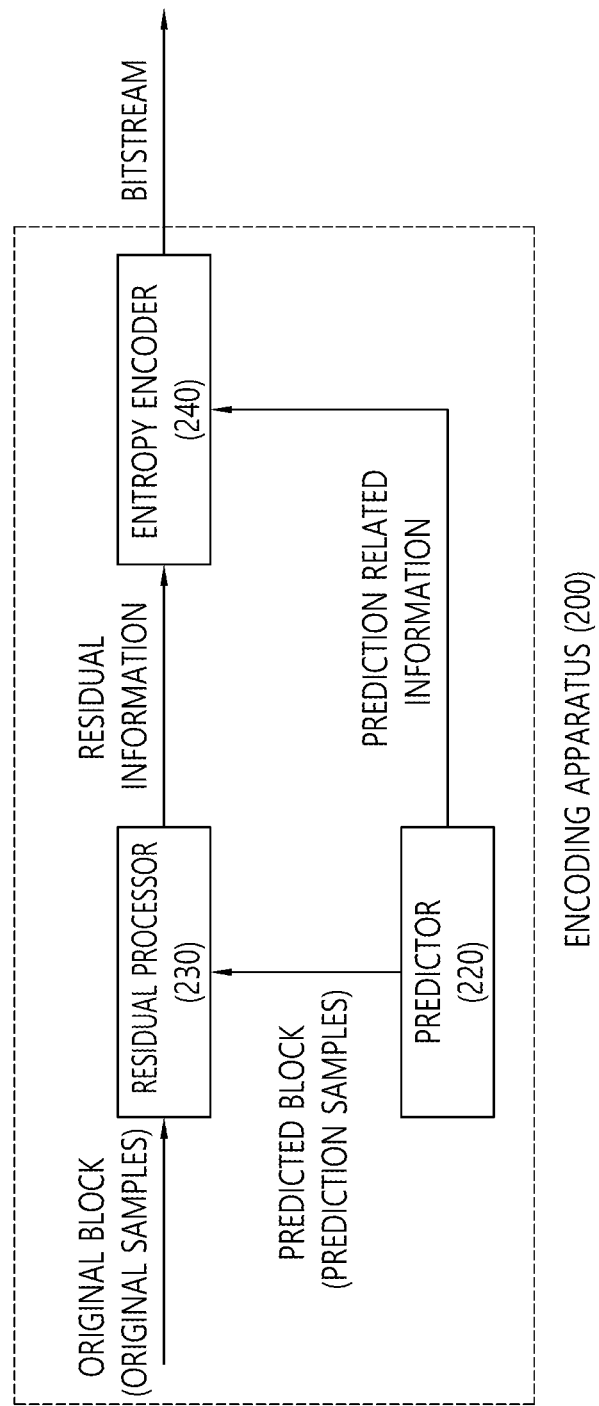

FIGS. 7 and 8 schematically illustrate a video/image encoding method and an example of related components according to an embodiment of the present document.

The video/image encoding method disclosed in FIG. 7 may be performed by the (video/image) encoding apparatus 200 disclosed in FIGS. 2 and 8. As an example, S700 and S710 of FIG. 7 may be performed by the predictor 220 of the encoding apparatus 200. S720 may be performed by the entropy encoder 240 of the encoding apparatus 200. The video/image encoding method disclosed in FIG. 7 may include the embodiments as described above in the present document.

Specifically, referring to FIGS. 7 and 8, the predictor 220 of the encoding apparatus may perform at least one of inter prediction or intra prediction for the current block in the current picture (S700), and based on this, may generate prediction samples (prediction block) for the current block and prediction information (S710).

In case that the intra prediction is performed, the predictor 220 may predict the current block with reference to samples in the current picture (neighboring samples of the current block). The predictor 220 may determine a prediction mode being applied to the current block using the prediction mode applied to the neighboring samples.

In case that the inter prediction is performed, the predictor 220 may generate prediction information and a predicted block for the current block by performing the inter prediction based on motion information of the current block. The above-described prediction information may include information on the prediction mode and information on the motion information. The information on the motion information may include candidate selection information (e.g., merge index, mvp flag, or mvp index) that is information for deriving a motion vector. Further, the information on the motion information may include information on a motion vector difference (MVD) and/or reference picture index information. Further, the information on the motion information may include information representing whether L0 prediction, L1 prediction, or bi-prediction is applied. For example, the predictor 220 may derive the motion information of the current block in the current picture based on motion estimation. For this, the predictor 220 may search a highly correlated similar reference block in the unit of a fractional pixel in a determined search range in the reference picture using the original block in the original picture for the current block, and through this, may derive the motion information. The block similarity may be derived based on a difference between phase-based sample values. As an example, the block similarity may be calculated based on a sum of absolute difference (SAD) between the current block (or template of the current block) and the reference block (or template of the reference block). In this case, the motion information may be derived based on the reference block having the smallest SAD in the search area. The derived motion information may be signaled to the decoding apparatus according to various methods based on the inter prediction mode.

The residual processor 230 of the encoding apparatus may generate residual samples and residual information based on the prediction samples generated by the predictor 220 and the original picture (original block and original samples). Here, the residual information is information on the residual samples, and may include information on (quantized) transform coefficients for the residual samples.

The adder (or reconstructor) of the encoding apparatus may generate reconstructed samples (reconstructed picture, reconstructed block, and reconstructed sample array) by adding the residual samples generated by the residual processor 230 and the prediction samples generated by the predictor 220 to each other.

The entropy encoder 240 of the encoding apparatus may encode image information including the prediction information generated by the predictor 220, the residual information generated by the residual processor 230, and information on the HLS (S720).

The information on the HLS may include information/syntax for a parameter set being used for decoding of the image/video information. As an example, the parameter set may include APS, PPS, SPS, VPS, and the like. The SPS and/or VPS may include PTL information (profile_tier_level syntax) as described above in Table 1 and Table 2.

The PTL information may include profile information (general_profile_idc) representing a profile to which output layer sets conform, level information (general_level_idc) representing the level to which the output layer sets conform, tier context information for interpretation of the level information, and general constraint information for constraints to which the output layer sets conform. The general constraint information may be simply called constraint information.

If the PTL information is included in the VPS, the output layer sets include one or more output layer sets specified by the VPS. In case that the PTL information is included in the SPS, the output layer set is the output layer set including only the lowermost layer among the layers referring to the SPS.

The encoding apparatus may generate the level information representing the level to which the output layer sets conform in generating the PTL information, and may generate the profile information representing the profile to which the output layer sets conform, the tier context information for interpretation of the level information, and the general constraint information. Here, the general constraint information may be present next to the level information in the PTL information (profile_tier_level syntax). That is the level information may be first present prior to the general constraint information in the PTL information.

The general constraint information may include a flag (gci_present_flag) representing whether information on the constraints (general constraint flags) is present in the general constraint information. If the value of the gci_present_flag is 1, the information on the constraints may be included in the general constraint information. If the value of the gci_present_flag is 0, the information on the constraints may not be present in the general constraint information.

Meanwhile, the general constraint information may include alignment information (gci_alignment_zero_bit) having the value of 0. The alignment information may be present next to the number information representing the number of bits reserved for the information on the constraints and/or the reserved bits in the general constraint information. As an example, the alignment information may be present in the last position of the general constraint information.

The entropy encoder 240 of the encoding apparatus may encode the image information including the level information, the profile information, the tier information, and/or the general constraint information. The encoded image information may be transmitted or stored in the form of the bitstream in the NAL unit.

According to the present document, since the encoding apparatus may not signal the general constraint information by configuring the value of the gci_present_flag as 0 even in case of signaling the PTL information, it may not signal the general constraint information in case that the general constraint information is unnecessary in the decoding procedure. Further, since the general constraint information is present next to the profile information, the tier information, and the level information in the PTL information, the decoding apparatus may process the general constraint information separately from the profile, the tier, and the level information.

Figure 9:
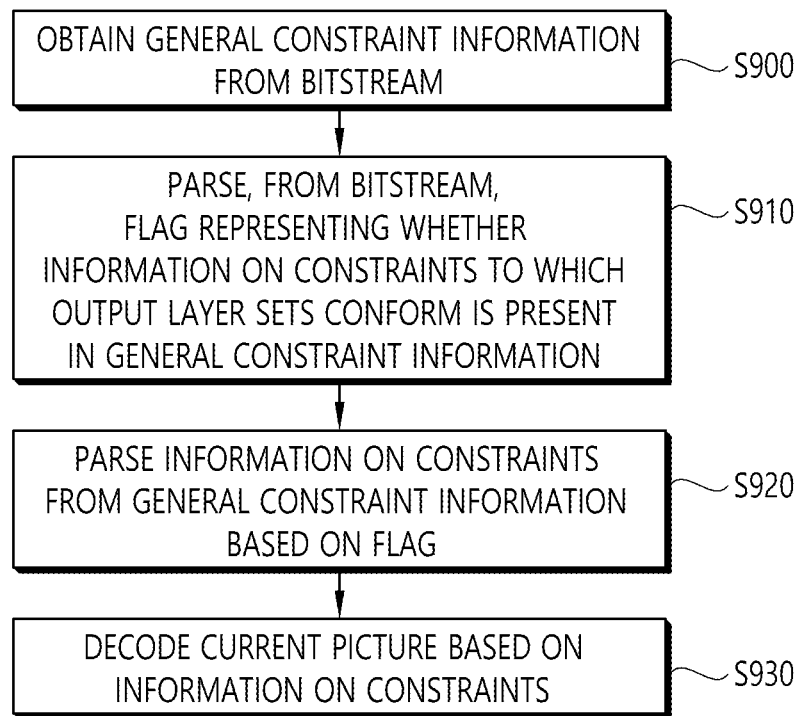
FIGS. 9 and 10 schematically illustrate a video/image decoding method and an example of related components according to an embodiment of the present document.
Figure 10:
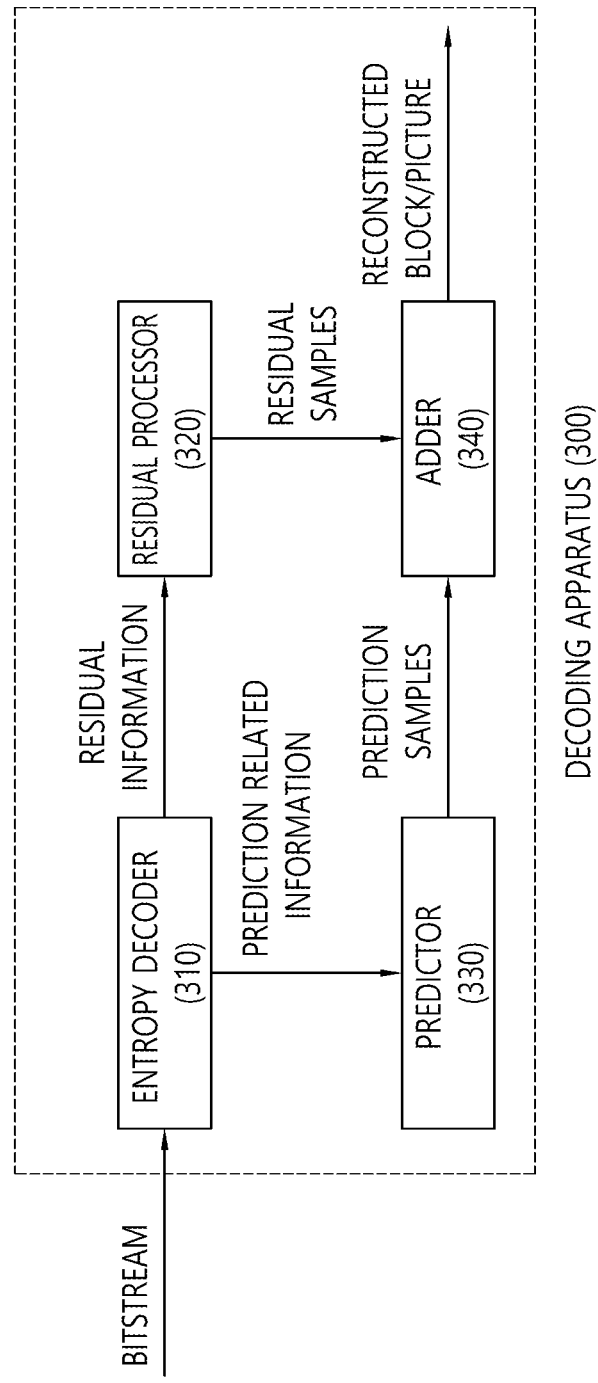

FIGS. 9 and 10 schematically illustrate a video/image decoding method and an example of related components according to an embodiment of the present document.

The video/image decoding method disclosed in FIG. 9 may be performed by the (video/image) decoding apparatus 300 disclosed in FIGS. 3 and 10. Specifically, for example, S900 to S920 of FIG. 9 may be performed by the entropy decoder 310 of the decoding apparatus. S940 may be performed by the residual processor 320, the predictor 330, and the adder 340 of the decoding apparatus. The video/image decoding method disclosed in FIG. 9 may include the above-described embodiments.

Referring to FIGS. 9 and 10, the entropy decoder 310 of the decoding apparatus may obtain image information from a bitstream. The image information may include prediction related information, residual information, information on the HLS, and in-loop filtering related information. The prediction related information may include inter/intra prediction classification information, intra prediction mode related information, and inter prediction mode related information. The information on the HLS may include information/syntax for a parameter set being used for decoding of the image/video information. Here, the parameter set may include APS, PPS, SPS, VPS, and the like. The SPS and/or VPS may include PTL information (profile_tier_level syntax) as described above in Table 1 and Table 2. The PTL information may include profile information (general_profile_idc) representing a profile to which output layer sets conform, level information (general_level_idc) representing the level to which the output layer sets conform, tier context information (general_tier_flag) for interpretation of the level information, and general constraint information (general_constraint_info) for constraints to which the output layer sets conform.

The entropy decoder 310 of the decoding apparatus may parse, from the PTL information in the bitstream, the level information representing the level to which the output layer sets conform, the profile information representing the profile to which the output layer sets conform, and/or the tier context information for interpretation of the level information. Further, the entropy decoder 310 of the decoding apparatus may obtain the general constraint information for the constraints to which the output layer sets conform from the PTL information in the bitstream (S900). Here, the general constraint information may be present next to the level information in the PTL information. That is, the entropy decoder 310 of the decoding apparatus may obtain the general constraint information after parsing the level information in the PTL information.

The entropy decoder 310 of the decoding apparatus may parse, from the general constraint information, a flag (gci_present_flag) representing whether the information on the constraints (general constraint flags) is present in the general_constraint_info syntax (S910). Further, the entropy decoder 310 of the decoding apparatus may parse the information on the constraints from the general constraint information based on the flag (S920). For example, if the value of the gci_present_flag is 1, the information on the constraints may be included in the general constraint information. If the value of the gci_present_flag is 0, the information on the constraints may not be present in the general constraint information.

Meanwhile, the general constraint information may include number information representing the number of bits reserved for the information on the constraints, the reserved bits, and alignment information (gci_alignment_zero_bit) having the value of 0. The alignment information may be present next to the number information and/or the reserved bits. In other words, the entropy decoder 310 of the decoding apparatus may parse the alignment information after parsing the number information and the reserved bits from the general constraint information. For example, the alignment information may be lastly parsed from the general constraint information.

The decoding apparatus may perform the decoding procedure for the current picture based on the HLS information including the level information and the general constraint information, the prediction related information, and the residual information (S930).

For example, the predictor 330 of the decoding apparatus may generate prediction samples for the current block in the current picture by performing inter prediction and/or intra prediction for the current block in the current picture using the prediction related information based on the HLS information obtained from the bitstream. Further, the residual processor 320 of the decoding apparatus may generate the residual samples based on the residual information obtained from the bitstream. The adder 340 of the decoding apparatus may generate reconstructed samples based on the prediction samples generated by the predictor 330 and the residual samples generated by the residual processor 320, and may generate a reconstructed picture (reconstructed block) based on the reconstructed samples.

Thereafter, as needed, in order to enhance the subjective/objective image quality, the in-loop filtering procedure, such as deblocking filtering, SAO and/or ALF procedure, may be applied to the reconstructed picture.

Although methods have been described on the basis of a flowchart in which steps or blocks are listed in sequence in the above-described embodiments, the steps of the present document are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present document.

The aforementioned method according to the present document may be in the form of software, and the encoding apparatus and/or decoding apparatus according to the present document may be included in a device for performing image processing, for example, a TV, a computer, a smart phone, a set-top box, a display device, or the like.

When the embodiments of the present document are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present document may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which the embodiment(s) of the present document is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VoD) service provider, an Over The Top (OTT) video device, an internet streaming service provider, a 3D video device, a Virtual Reality (VR) device, an Augment Reality (AR) device, an image telephone video device, a vehicle terminal (for example, a vehicle (including an autonomous vehicle) terminal, an airplane terminal, or a ship terminal), and a medical video device; and may be used to process an image signal or data. For example, the OTT video device may include a game console, a Blu-ray player, an Internet-connected TV, a home theater system, a smartphone, a tablet PC, and a Digital Video Recorder (DVR).

In addition, the processing method to which the embodiment(s) of the present document is applied may be produced in the form of a program executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer according to the embodiment(s) of the present document. The program code may be stored on a computer-readable carrier.

Figure 11:
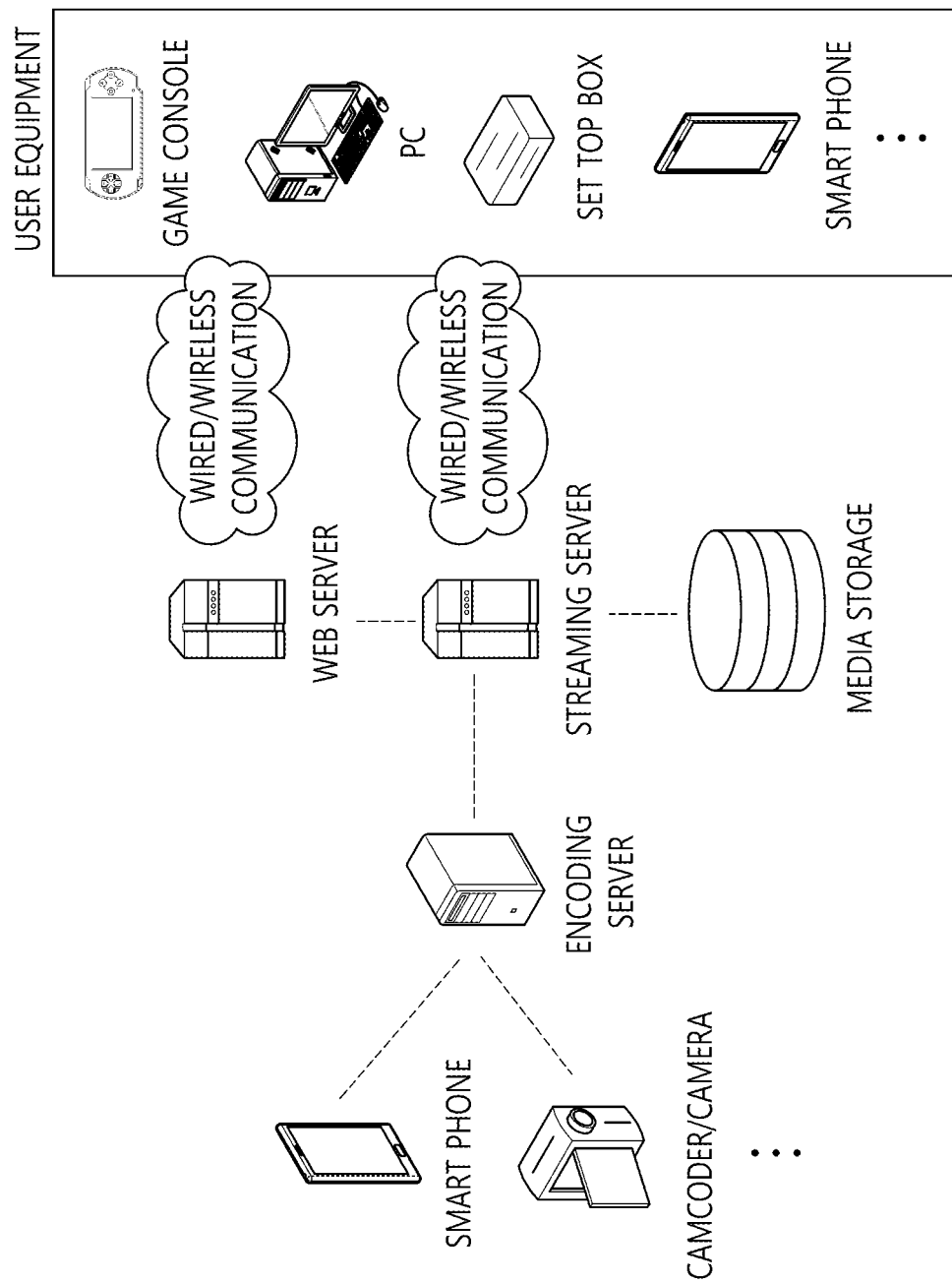
FIG. 11 illustrates an example of a content streaming system to which embodiments disclosed in the present document are applicable.

FIG. 11 represents an example of a contents streaming system to which the embodiment of the present document may be applied.

Referring to FIG. 11, the content streaming system to which the embodiments of the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case in which the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

What is claimed is:

1. A video decoding method performed by a video decoding apparatus, comprising:
    parsing, from a bitstream, a flag representing whether information on constraints to which output layer sets conform is present in a general constraint information syntax, the flag being present in the general constraint information syntax;
    parsing the information on the constraints from the general constraint information syntax based on the flag; and
    decoding a current picture encoded based on the information on the constraints,
    wherein the general constraint information syntax includes number information on the constraints and alignment information,
    wherein the alignment information is present after the number information in the general constraint information syntax, and
    wherein the alignment information is parsed last from the general constraint information syntax.

2. The video decoding method of claim 1, wherein the information on the constraints is not present in the general constraint information syntax based on that a value of the flag is 0.

3. The video decoding method of claim 1, wherein the information on the constraints and the number information are parsed from the general constraint information syntax based on that a value of the flag is 1.

4. The video decoding method of claim 1, wherein the number information represents the number of reserved bits for the information on the constraints.

5. The video decoding method of claim 4, wherein the alignment information is present after the reserved bits in the general constraint information syntax.

6. The video decoding method of claim 1, wherein the general constraint information syntax is present in a profile_tier_level syntax of the bitstream,
    wherein the profile_tier_level syntax comprises level information representing a level to which the output layer sets conform, and
    wherein the general constraint information syntax is present after the level information in the profile_tier_level syntax structure.

7. A video encoding method performed by a video encoding apparatus, comprising:
    performing inter prediction or intra prediction for a current block in a current picture;
    generating prediction information for the current block based on the inter prediction or the intra prediction; and
    encoding image information including the prediction information,
    wherein the image information includes a flag representing whether information on constraints to which output layer sets conform is present in a general constraint information syntax of the image information,
    wherein the flag is present in the general constraint information syntax,
    wherein the general constraint information syntax includes number information on the constraints and alignment information,
    wherein the alignment information is present after the number information in the general constraint information syntax, and
    wherein the alignment information is encoded last into the general constraint information syntax.

8. The video encoding method of claim 7, wherein the general constraint information syntax does not include the information on the constraints based on that a value of the flag is 0, and includes the information on the constraints based on that the value of the flag is 1.

9. The video encoding method of claim 7, wherein the number information represents the number of reserved bits for the information on the constraints.

10. The video encoding method of claim 9, wherein the alignment information is present after the reserved bits in the general constraint information syntax.

11. The video encoding method of claim 7, wherein the general constraint information syntax is present in a profile_tier_level syntax of the image information,
    wherein the profile_tier_level syntax comprises level information representing a level to which the output layer sets conform, and
    wherein the general constraint information syntax is present after the level information in the profile_tier_level syntax structure.

12. A non-transitory computer-readable digital storage medium for storing a bitstream generated by the image encoding method of claim 7.

13. A method for transmitting data for image information, comprising:
- performing inter prediction or intra prediction for a current block in a current picture;
- generating prediction information for the current block based on the inter prediction or the intra prediction;
- encoding the image information including the prediction information; and
- transmitting the data including the image information,
- wherein the image information includes a flag representing whether information on constraints to which output layer sets conform is present in a general constraint information syntax of the image information, wherein the flag is present in the general constraint information syntax,
- wherein the general constraint information syntax includes number information on the constraints and alignment information,
- wherein the alignment information is present after the number information in the general constraint information syntax, and
- wherein the alignment information is encoded last into the general constraint information syntax.

* * * * *